United States Patent
Yoshino

(10) Patent No.: US 10,721,646 B2
(45) Date of Patent: Jul. 21, 2020

(54) TERMINAL DEVICE, COMMUNICATION SYSTEM AND COMMUNICATION CONTROL METHOD

(71) Applicant: PANASONIC CORPORATION, Osaka (JP)

(72) Inventor: Masaaki Yoshino, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/333,489

(22) PCT Filed: Jun. 9, 2017

(86) PCT No.: PCT/JP2017/021523
§ 371 (c)(1),
(2) Date: Mar. 14, 2019

(87) PCT Pub. No.: WO2018/051591
PCT Pub. Date: Mar. 22, 2018

(65) Prior Publication Data
US 2019/0268791 A1 Aug. 29, 2019

(30) Foreign Application Priority Data
Sep. 16, 2016 (JP) ................................ 2016-181481

(51) Int. Cl.
*H04W 24/10* (2009.01)
*H04W 64/00* (2009.01)
(Continued)

(52) U.S. Cl.
CPC ........... *H04W 24/10* (2013.01); *H04W 48/16* (2013.01); *H04W 64/006* (2013.01); *H04W 84/045* (2013.01)

(58) Field of Classification Search
CPC ..... H04W 24/08; H04W 24/10; H04W 48/04; H04W 48/16; H04W 4/029; H04W 64/00;
(Continued)

(56) References Cited

U.S. PATENT DOCUMENTS

| 9,565,621 B2 | 2/2017 | Sawamoto et al. |
| 2004/0127217 A1* | 7/2004 | Aoki ................... G08G 1/0962 455/435.1 |

(Continued)

FOREIGN PATENT DOCUMENTS

| JP | 2002-027519 | * 1/2002 |
| JP | 2012-227641 | 11/2012 |

(Continued)

OTHER PUBLICATIONS

Internation Search Report issued in International Patent Application No. PCT/JP2017/021523, dated Aug. 29, 2017.

*Primary Examiner* — Jean A Gelin
(74) *Attorney, Agent, or Firm* — Greenblum & Bernstein, P.L.C.

(57) ABSTRACT

In order for a terminal to efficiently find an optimal connection destination based on a state of the terminal, the terminal includes: a location information acquirer configured to acquire the terminal's location information; an information storage configured to accumulate historical information on past communication statuses at respective locations within a communication area of the base station apparatus; a moving state estimator configured to estimate a moving state of the terminal based on the location information; a destination predictor configured to predict a destination area of the terminal based on the moving state; a measurement target extractor configured to extract one or more measurement target candidates as targets for communication quality measurement based on the historical information associated with the destination area; and a commu- (Continued)

nication quality measurer configured to measure one or more communication qualities associated with the one or more measurement target candidates extracted by the measurement target extractor.

14 Claims, 15 Drawing Sheets

(51) Int. Cl.
*H04W 48/16* (2009.01)
*H04W 84/04* (2009.01)

(58) Field of Classification Search
CPC ..... H04W 84/12; H04W 48/18; H04W 72/02; H04W 64/003
See application file for complete search history.

(56) References Cited

U.S. PATENT DOCUMENTS

| | | | | |
|---|---|---|---|---|
| 2005/0170848 | A1* | 8/2005 | Sato | H04W 4/021 |
| | | | | 455/456.3 |
| 2007/0106467 | A1* | 5/2007 | Sumizawa | G01C 21/26 |
| | | | | 701/410 |
| 2007/0155404 | A1* | 7/2007 | Yamane | G01C 21/3694 |
| | | | | 455/456.1 |
| 2007/0219708 | A1* | 9/2007 | Brasche | G01C 21/32 |
| | | | | 701/457 |
| 2009/0043499 | A1* | 2/2009 | Endo | G09B 29/106 |
| | | | | 701/414 |
| 2011/0291884 | A1* | 12/2011 | Oh | G01S 19/48 |
| | | | | 342/357.31 |
| 2012/0327922 | A1* | 12/2012 | Takahashi | G01S 5/0263 |
| | | | | 370/338 |
| 2013/0100819 | A1 | 4/2013 | Anchan et al. | |
| 2014/0280319 | A1* | 9/2014 | Rishe | G06F 3/0481 |
| | | | | 707/769 |
| 2014/0313301 | A1* | 10/2014 | Wakai | H04N 5/232 |
| | | | | 348/77 |
| 2014/0364154 | A1 | 12/2014 | Sawamoto et al. | |
| 2015/0163625 | A1* | 6/2015 | Saida | H04W 4/029 |
| | | | | 455/456.1 |
| 2015/0269622 | A1* | 9/2015 | Kitagishi | G06Q 30/0266 |
| | | | | 705/14.63 |
| 2016/0078757 | A1* | 3/2016 | Inaba | G08G 1/16 |
| | | | | 701/119 |
| 2016/0081001 | A1 | 3/2016 | Xu et al. | |
| 2016/0219409 | A1* | 7/2016 | Cai | H04W 64/006 |
| 2016/0265926 | A1* | 9/2016 | Sato | G01C 21/3617 |
| 2017/0325165 | A1* | 11/2017 | Kato | H04W 16/32 |
| 2018/0027545 | A1* | 1/2018 | Kato | H04W 36/0022 |
| | | | | 370/329 |
| 2018/0253105 | A1* | 9/2018 | Suzuki | G01C 21/32 |

FOREIGN PATENT DOCUMENTS

| | | | |
|---|---|---|---|
| JP | 2014-116814 | * | 6/2014 |
| JP | 2015-534290 | | 11/2015 |
| JP | 2016-521924 | | 7/2016 |
| JP | 5944517 | | 7/2016 |

* cited by examiner

Fig.5

| mesh ID | cxn dest info | | | comm quality info | | |
|---|---|---|---|---|---|---|
| | cxn dest ID | frequency | comm scheme | received poser [dBm] | throughput [Mbps] | comm data amount [MB] |
| 1 | 101 | F1 | LTE | −90 | 20 | 50 |
| 2 | 101 | F1 | LTE | −85 | 30 | 100 |
| 2 | 103 | F3 | LTE-A | −75 | 100 | 500 |
| 3 | 102 | F2 | New RAT | −70 | 600 | 1000 |
| 4 | 123ABC | F5 | WLAN | −70 | 200 | 300 |
| ⋮ | ⋮ | ⋮ | ⋮ | ⋮ | ⋮ | ⋮ |

*Fig.6*

| moving speed [km/h] | moving distance during cxn dest search delay time (different freq) [m] | moving distance during cxn dest search delay time (same freq) [m] |
|---|---|---|
| 3 | 3.2 | 0.8 |
| 10 | 10.7 | 2.8 |
| 20 | 21.3 | 5.6 |
| 50 | 53.3 | 13.9 |

Fig.7
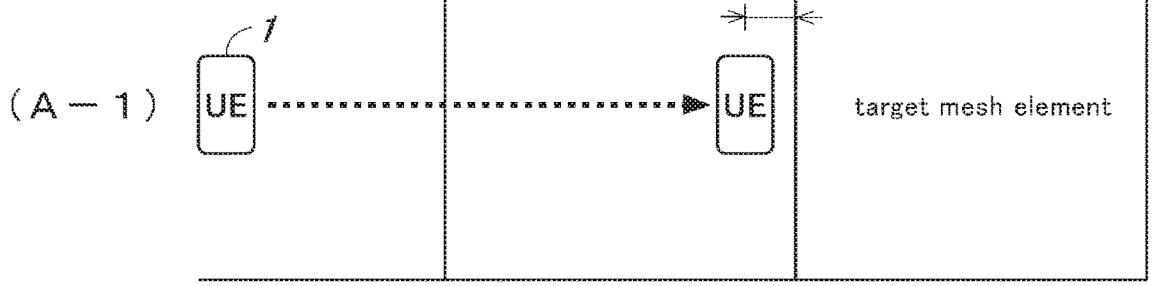
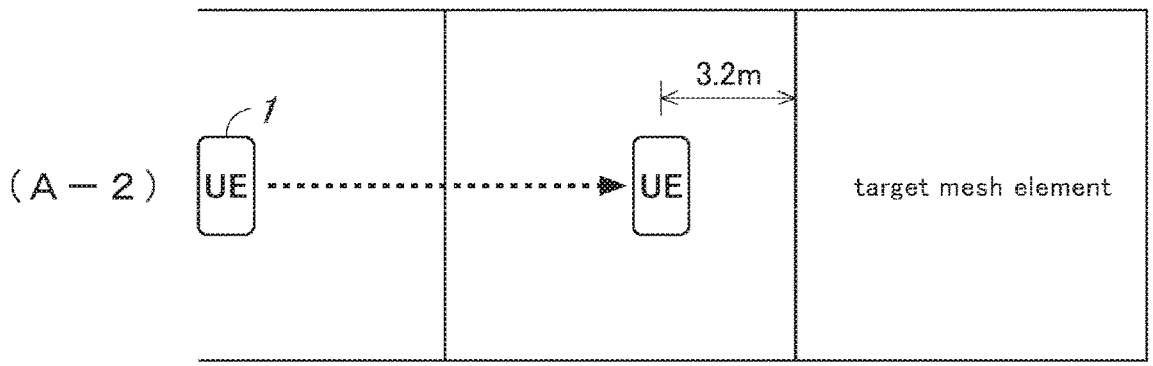
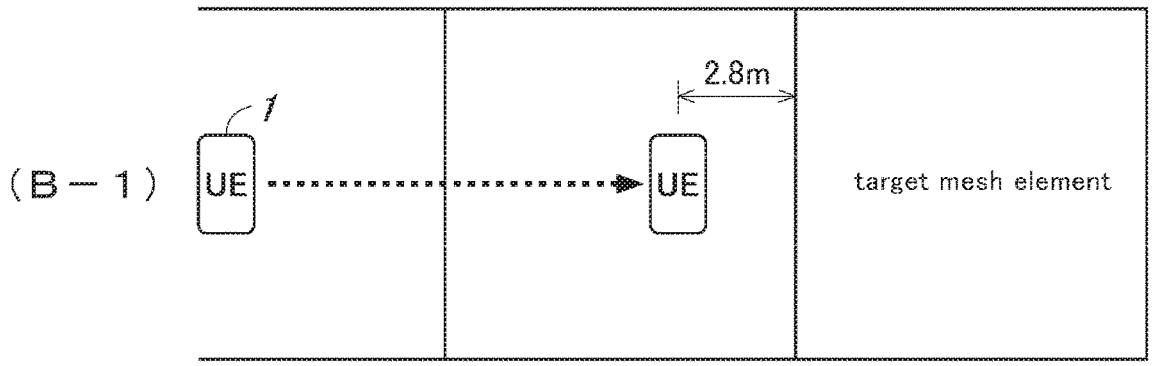
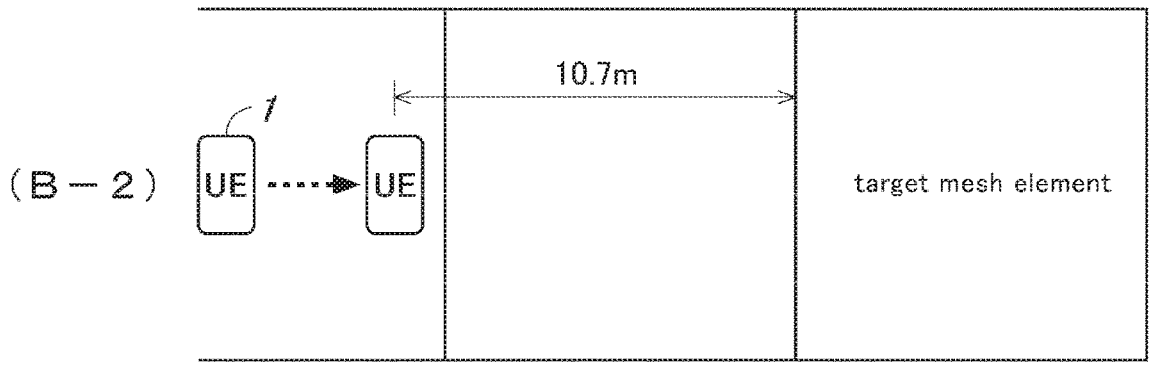

(A)

(B)

*Fig.10*
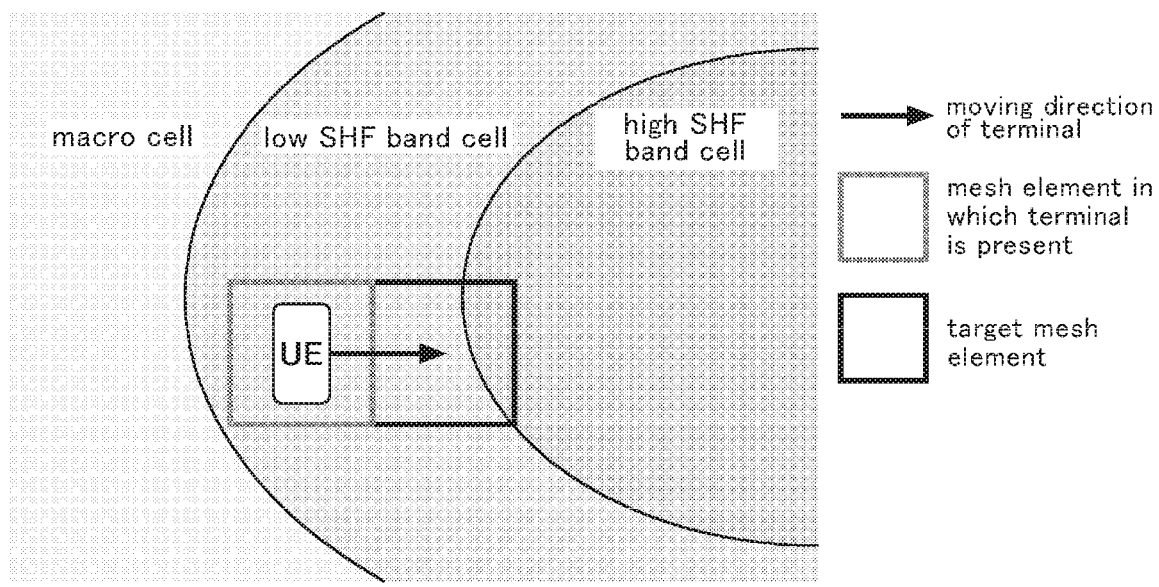
(A)
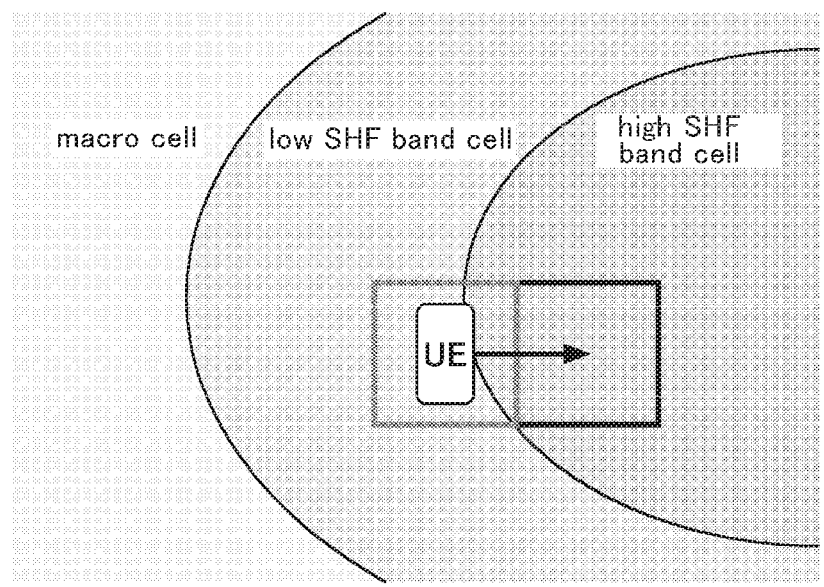
(B)

*Fig.12*

| mesh ID | moving speed [km/h] | cxn dest info | | | comm quality info | | |
|---|---|---|---|---|---|---|---|
| | | coxn dest ID | frequency | comm scheme | received poser [dBm] | throughput [Mbps] | comm data amount [MB] |
| 1 | 5 | 101 | F1 | LTE | −90 | 20 | 50 |
| 2 | 20 | 101 | F1 | LTE | −85 | 30 | 100 |
| 2 | 10 | 103 | F3 | LTE-A | −75 | 100 | 500 |
| ⋮ | ⋮ | ⋮ | ⋮ | ⋮ | ⋮ | ⋮ | ⋮ |

TERMINAL DEVICE, COMMUNICATION SYSTEM AND COMMUNICATION CONTROL METHOD

TECHNICAL FIELD

The present invention relates to a terminal device for performing wireless communication with a base station apparatus, a base station apparatus for performing wireless communication with a terminal device, a communication system including a terminal device a base station apparatus, and a communication control method used in a terminal device for performing wireless communication with base station apparatus.

BACKGROUND ART

In recent years, various wireless communication schemes such as cellular communications (e.g. LTE (Long Term Evolution)) and wireless LANs have been widely used. In future, 5G (next generation mobile communication system) technologies are expected to be added to the communication schemes, which will expand a range of choices of connection destinations for a terminal device. Particularly, a 5G communication system (fifth generation mobile communication system), which includes a number of small cells using a high SHF (Super High Frequency) band, needs to perform a lot of controls in order to choose a connection destination, and thus it takes sufficient time to choose a connection destination. Therefore, it is necessary for such a system to efficiently choose an optimal connection destination from a large number of connection destination candidates.

One possible approach to efficiently choosing a connection destination is to control the selection of a connection destination based on a state of a terminal device, and one known example of such technologies is to control switching a destination cell based on the moving state of a terminal device (See Patent Document 1). Another known example of such technologies is to perform controls on the selection of a connection destination based on an estimated duration that terminal device is expected to remain connected to an access point (See Patent Document 2).

PRIOR ART DOCUMENT(S)

Patent Document(s)

Patent Document 1: JP2016-521924A
Patent Document 2: JP5944517B

SUMMARY OF THE INVENTION

Task to be Accomplished by the Invention

In such systems, a terminal performs a connection destination search operation (cell search operation) to extract an optimal connection destination, and such a connection destination search operation involves measuring a communication quality (or communication qualities) of each connection destination. If the terminal can narrow down a range of connection destination candidates as targets for communication quality measurement to thereby shorten the time required for communication quality measurement operations, the time that is used to transmit user data is relatively increased, which can effectively increase a system capacity. Moreover, by narrowing down a range of connection destination candidates as targets for communication quality measurements, the terminal can avoid performing unnecessary measurement operations, thereby reducing power consumption. However, the above described conventional technologies do not involve controlling a connection destination search operation based on a state of a terminal device and thus cannot implement an efficient search for a connection destination.

The present invention has been made in view of such problems of the prior art, and a primary object of the present invention is to provide a terminal device, a communication system, and a communication control method, each enabling a terminal to perform a connection destination search operation so as to efficiently find an optimal connection destination based on a state of the terminal.

Means to Accomplish the Task

An aspect of the present invention provides a terminal device for performing wireless communication with a base Station apparatus, comprising: a location information acquirer configured to acquire location information or the terminal device; an information storage configured to accumulate historical information on past communication statuses at respective locations within a communication area of the base station apparatus; a moving state estimator configured to estimate a moving state of the terminal device based on the location information; a destination predictor configured to predict a destination area of the terminal device; a measurement target extractor configured to extract, among candidate base station apparatuses which are connectable to the terminal device, one or more measurement target candidates as targets for communication qualify measurement based on the historical information associated with the destination area; and a communication quality measurer configured to measure one or more communication qualities associated with the one or more measurement target candidates extracted by the measurement target extractor.

Another aspect of the present invention provides a communication system including a terminal device for performing wireless communication with a base station apparatus, wherein the terminal device comprises: a location information acquirer configured to acquire location information on the terminal device; an information storage configured to accumulate historical information on past communication statuses at respective locations within a communication area of the base station apparatus; a moving state estimator configured to estimate a moving state of the terminal device based on the Location information; a destination predictor configured to predict a destination area of the terminal device; a measurement target extractor configured to extract, among candidate base station apparatuses which are connectable to the terminal device, one or more measurement target candidates as targets for communication quality measurement based on the historical information associated with the destination area; and a communication quality measurer configured to measure one or more communication qualities associated with the one or more measurement target candidates extracted by the measurement target extractor.

Yet another aspect of the present invention provides a communication control method used in a terminal device for performing wireless communication with a base station apparatus, comprising: acquiring location information on the terminal device; estimating a moving state of the terminal device based on the location information; predicting a destination area of the terminal device; extracting, among candidate base station apparatuses which are connectable to the terminal device, one or more measurement target candidates as targets for communication quality measurement based on the historical information associated with the destination area; and measuring one or more communication qualities associated with the one or more measurement target candidates extracted by the measurement target extractor.

Effect of the Invention

According to the present invention, a terminal can perform a connection destination search operation (extraction of targets for measurement and communication quality measurement of the targets) which involves predicting a destination area of the terminal based on a moving state of the terminal, and narrowing down connection destination candidates as targets for communication quality measurement based on historical information associated with the destination area, thereby enabling the terminal to find an optimal connection destination in an efficient manner.

BRIEF DESCRIPTION OF THE DRAWINGS

FIG. 5 is an explanatory view showing an example of historical database including recorded data;

FIG. 6 is an explanatory view showing examples of moving distances of the terminal 1 during connection destination search delay times for each moving speed of the terminal 1;

FIG. 7 is an explanatory view showing examples of timing to start a connection destination search operation in the terminal 1;

FIG. 10 is an explanatory view showing examples of effects achieved by the connection destination search operation;

FIG. 12 is an explanatory view showing another example of historical database including recorded data;

DESCRIPTION OF THE PREFERRED EMBODIMENT(S)

Figure 1:
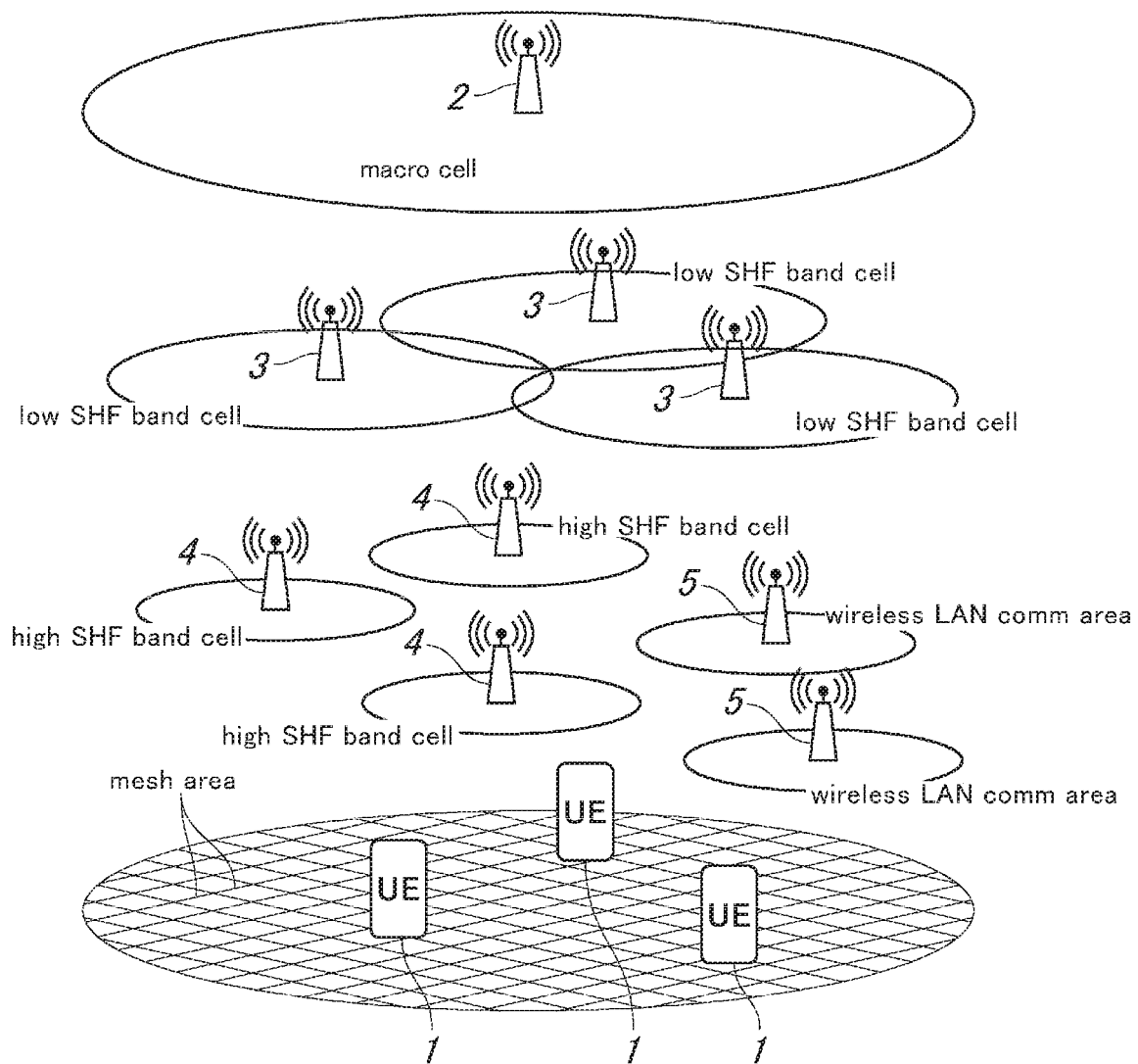
FIG. 1 is a diagram showing a general configuration of a communication system according to a first embodiment of the present invention.

A first aspect of the present invention made to achieve the above-described object is a terminal device for performing wireless communication with a base station apparatus, comprising: a location information acquirer configured to acquire location information on the terminal device; an information storage configured to accumulate historical information on past communication statuses at respective locations within a communication area of the base station apparatus; a moving state estimator configured to estimate a moving state of the terminal device based on the location information; a destination predictor configured to predict a destination area of the terminal device based on the moving state; a measurement target extractor configured to extract, among candidate base station apparatuses which are connectable to the terminal device, one or more measurement target candidates as targets for communication quality measurement based on the historical information associated with the destination area, and a communication quality measurer configured to measure one or more communication qualities associated with the one or more measurement target candidates extracted by the measurement target extractor.

This configuration enables a terminal to perform a connection destination search operation (extraction of targets for measurement and communication quality measurement of the targets) which involves predicting a destination area of the terminal based on a moving state of the terminal, and narrowing down connection destination candidates as targets for communication quality measurement based on historical information associated with the destination area, thereby enabling the terminal to find an optimal connection destination in an efficient manner.

A second aspect of the present invention is the terminal device of the first aspect, wherein the moving state estimator acquires a moving speed of the terminal device as the moving state, and wherein, when the moving speed is high, the destination predictor sets the destination area to be greater than when the moving speed is low.

In this configuration, when a moving speed is high, a terminal can avoid performing a connection destination search operation to be wasted when the terminal pass through a destination area before the connection destination search operation is completed.

A third aspect of the present invention is the terminal device of the second aspect, wherein mesh element areas are determined for the communication area of the base station apparatus such that each mesh element area has a prescribed shape and a uniform size, and the information storage accumulates the historical information on each mesh element area, and wherein, when the moving speed is high, the destination predictor sets a greater number of mesh element areas for the destination area than when the moving speed is low.

In this configuration, when a moving speed is high, a terminal can avoid performing a connection destination search operation to be wasted.

A fourth aspect of the present invention is the terminal device of the second aspect, wherein mesh element areas are determined for the communication area of the base station apparatus such that each mesh element area has a prescribed shape and a uniform size, and the information storage accumulates the historical information on each mesh element area, and wherein, when the moving speed is high, each mesh element area is set to have a greater size than when the moving speed is low.

In this configuration, when a moving speed is high, a terminal can avoid performing a connection destination search operation to be wasted.

A fifth aspect of the present invention is the terminal device of the first aspect, wherein mesh element areas are determined for the communication area of the base station apparatus such that each mesh element area has a prescribed shape and a uniform size, and the information storage accumulates the historical information on each mesh element area, wherein the moving state estimator acquires a moving direction of the terminal device as the moving state, and wherein the destination predictor is notified of the moving direction, and when the terminal device moves in a diagonal direction relative to one of arrangement directions of the mesh element areas, the destination predictor sets a greater number of mesh element areas for the destination areas than when the terminal device moves in a parallel direction relative to the arrangement of the mesh element areas.

This configuration prevents a terminal from missing one or more mesh element areas to be destination areas, thereby enabling the terminal to properly perform a connection destination search.

A sixth aspect of the present invention is the terminal device of the first aspect, wherein mesh element areas are determined for the communication area of the base station apparatus such that each mesh element area has a prescribed shape and a uniform size, and the information storage accumulates the historical information on each mesh element area, wherein the moving state estimator acquires a moving speed of the terminal device as the moving state, and wherein the measurement target extractor performs an extraction operation to extract, among the candidate base station apparatuses which are connectable to the terminal device, one or more measurement target candidates based on the historical information on mesh element areas to be the destination areas, and when the moving speed is high, the measurement target extractor performs the extraction operations at shorter time intervals than when the moving speed is low.

This configuration enables a terminal to properly extract one or more measurement target candidates in each mesh element area to be a destination area by referring to the historical information on that mesh element area.

A seventh aspect of the present invention is the terminal device of the first aspect, wherein mesh element areas are determined for the communication area of the base station apparatus such that each mesh element area has a prescribed shape and a uniform size, and the information storage accumulates the historical information on each mesh element area, wherein the moving state estimator acquires a moving direction of the terminal device as the moving state, and wherein the measurement target extractor is notified of the moving direction and performs an extraction operation to extract, among the candidate base station apparatuses which are connectable to the terminal device, one or more measurement target candidates based on the historical information on mesh element areas to be the destination areas, and when the terminal device moves in a diagonal direction relative to one of arrangement directions of the mesh element areas, the measurement target extractor performs the extraction operations at shorter time intervals than when the terminal device moves in a parallel direction relative to the arrangement of the mesh element areas.

This configuration enables a terminal to properly extract one or more measurement target candidates in each mesh element area to be a destination area by referring to the historical information on that mesh element area.

An eighth aspect of the present invention is the terminal device of the first aspect, wherein the moving state estimator acquires a moving speed of the terminal device as the moving state, and wherein the measurement target extractor performs an extraction operation to extract, among the candidate base station apparatuses which are connectable to the terminal device, one or more measurement target candidates, and when the moving speed is high, the destination predictor extracts a greater number of measurement target candidates than when the moving speed is low.

This configuration enables a terminal to avoid re-extracting measurement target candidates, thereby enabling the terminal to property perform a connection destination search. Also, this configuration enables the terminal to properly extract one or more measurement target candidates in each mesh element area to be a destination area by referring to the historical information on that mesh element area.

A ninth aspect of the present invention is the terminal device of the first aspect, wherein mesh element areas are determined for the communication area of the base station apparatus such that each mesh element area has a prescribed shape and a uniform size, and the information storage accumulates the historical information on each mesh element area, wherein the moving state estimator acquires a moving direction of the terminal device as the moving state, and wherein the measurement target extractor is notified of the moving direction, and when the terminal device moves in a diagonal direction relative to one of arrangement directions of the mesh element areas, the measurement target extractor extracts, among the candidate base station apparatuses which are connectable to the terminal device, a greater number of measurement target candidates as targets for communication quality measurement than when the terminal device moves in a parallel direction relative to the arrangement of the mesh element areas.

This configuration enables a terminal to avoid re-extracting measurement target candidates, thereby enabling the terminal to properly perform a connection destination search. Also, this configuration enables the terminal to properly extract one or more measurement target candidates in each mesh element area to be a destination area by referring to the historical information on that mesh element area.

A tenth aspect of the present invention is the terminal device of the first aspect, further comprising a timing controller configured to control timing to start a connection destination search operation, the connection destination search operation being performed by the measurement target extractor and the communication quality measurer, wherein the moving state estimator acquires a moving speed of the terminal device as the moving state, and wherein the timing controller controls timing to start the connection destination search operation based on the moving speed and whether or not there is a difference between a radio communication frequency used by the base station apparatus to which the terminal device is currently connected and that used by each of the measurement target candidates.

This configuration enables a terminal to complete a connection destination search operation before entering a destination area, thereby enabling the terminal to make a connection with an optimal connection destination immediately after entering the destination area. Also, this configuration enables a terminal to avoid performing unnecessary connection destination search operations (and unnecessary measurement operation), thereby reducing its power consumption.

An eleventh aspect of the present invention is the terminal device of the first aspect, further comprising a historical data recorder configured to acquire current communication status information and record the acquired current communication status information as the historical information, wherein the moving state estimator acquires a moving speed of the terminal device as the moving state, wherein the historical data recorder acquires the current moving speed from the moving state estimator and records the historical information for each current moving speed into the historical information, and wherein the measurement target extractor acquires a current moving speed from the moving state estimator and extracts, among the candidate base station apparatuses which are connectable to the terminal device, the measurement target candidates based on the historical information associated with the current moving speed.

This configuration enables a terminal to choose an optimal connection destination depending on a moving speed of the terminal.

A twelfth aspect of the present invention is the terminal device of the eleventh aspect, wherein mesh element areas are determined for the communication area of the base station apparatus such that each mesh element area has a prescribed shape and a uniform size, and the information storage accumulates the historical information on each mesh element area, and the historical data recorder changes a period at which the historical data recorder performs recordation of the current communication status information into the historical information depending on the current moving speed.

In this configuration, the size of mesh element areas is unified, and a terminal can record historical information for each moving speed into a single large database.

A thirteenth aspect of the present invention is the terminal device according to claim 1, further comprising a historical data recorder configured to acquire current communication status information and record the acquired current communication status information as the historical information, and wherein the historical data recorder performs recordation of the current communication status information into the historical information at a content period.

In this configuration, a period at which a terminal performs recordation of historical information; that is, intervals of locations at which the terminal performs recordation of historical information changes depending on a moving speed of the terminal, which means that, since there is no large difference in the moving speed of users in a same section, the terminal can perform connection destination search operations at proper timing depending on a period at which the terminal performs the recordation of historical information.

A fourteenth aspect of the present invention is a communication system including a terminal device for performing wireless communication with a base station apparatus, wherein the terminal device comprises: a location information acquirer configured to acquire location information on the terminal device; an information storage configured to accumulate historical information on past communication statuses at respective locations within a communication area of the base station apparatus; a moving state estimator configured to estimate a moving state of the terminal device based on the location information; a destination predictor configured to predict a destination area of the terminal device based on the moving state; a measurement target extractor configured to extract, among candidate base station apparatuses which are connectable to the terminal device, one or more measurement target candidates as targets for communication quality measurement based on the historical information associated with the destination area; and a communication quality measurer configured to measure one or more communication qualities associated with the one or more measurement target candidates extracted by the measurement target extractor.

This configuration enables a terminal to efficiently find an optimal connection destination in the same manner as the first aspect of the present invention.

A fifteenth aspect of the present invention is a communication control method used in a terminal device for performing wireless communication with a base station apparatus, comprising: acquiring location information on the terminal device; estimating a moving state of the terminal device based on the location information; predicting a destination area of the terminal device based on the moving state; extracting, among candidate base station apparatuses which are connectable to the terminal device, one or more measurement target candidates as targets for communication quality measurement based on the historical information associated with the destination area; and measuring one or more communication qualities associated with the one or more measurement target candidates extracted by the measurement target extractor.

This configuration enables a terminal to efficiently find an optimal connection destination in the same manner as the first aspect of the present invention.

Embodiments of the present invention will be described below with reference to the drawings.

FIG. 1 is a diagram showing a general configuration of a communication system according to an embodiment of the present invention.

The communication system includes a terminal 1 (terminal device, denoted as UE 1 in the drawings), a macro cell base station 2 (base station apparatus), a low SHF band base station 3 (base station apparatus), a high SHF band base station 4 (base station apparatus), and a wireless LAN base station 5 (access point, base station apparatus). The macro cell, the low SHF band cell, the high SHF band cell, and the wireless LAN are disposed so that their communication areas overlap with one another.

The terminal 1 may be a smartphone, a tablet terminal, and any other type of terminal. The terminal 1 is capable of communicating with all of the macro cell base station 2, the low SHF band base station 3, the high SHF band base station 4, and the wireless LAN base station 5.

The macro cell base station 2 performs wireless communication using a UHF band (frequency: 300 MHz to 3 GHz). The low SHF band base station 3 performs wireless communication using a low SHF band (frequency: 3 GHz to 6 GHz). The high SHF band base station 4 performs wireless communication using a high SHF band (frequency: 6 GHz to 80 GHz band). The wireless LAN base station 5 performs wireless LAN communication using a wireless communication scheme such as a WiFi (Registered Trademark) communication system or a WiGig (Registered Trademark) communication system.

In the present embodiment, a mesh area consisting of mesh element areas is determined for an area including all the communication areas of the macrocell, the low SHF band cell, the high SHF band cell, and the wireless LAN such that the mesh element areas have a uniform size and a prescribed shape (for example, a square, a circle, an ellipse), and the terminal 1 includes a historical database configured to accumulate historical information on past communication statuses associated with each mesh element area.

Figure 2:
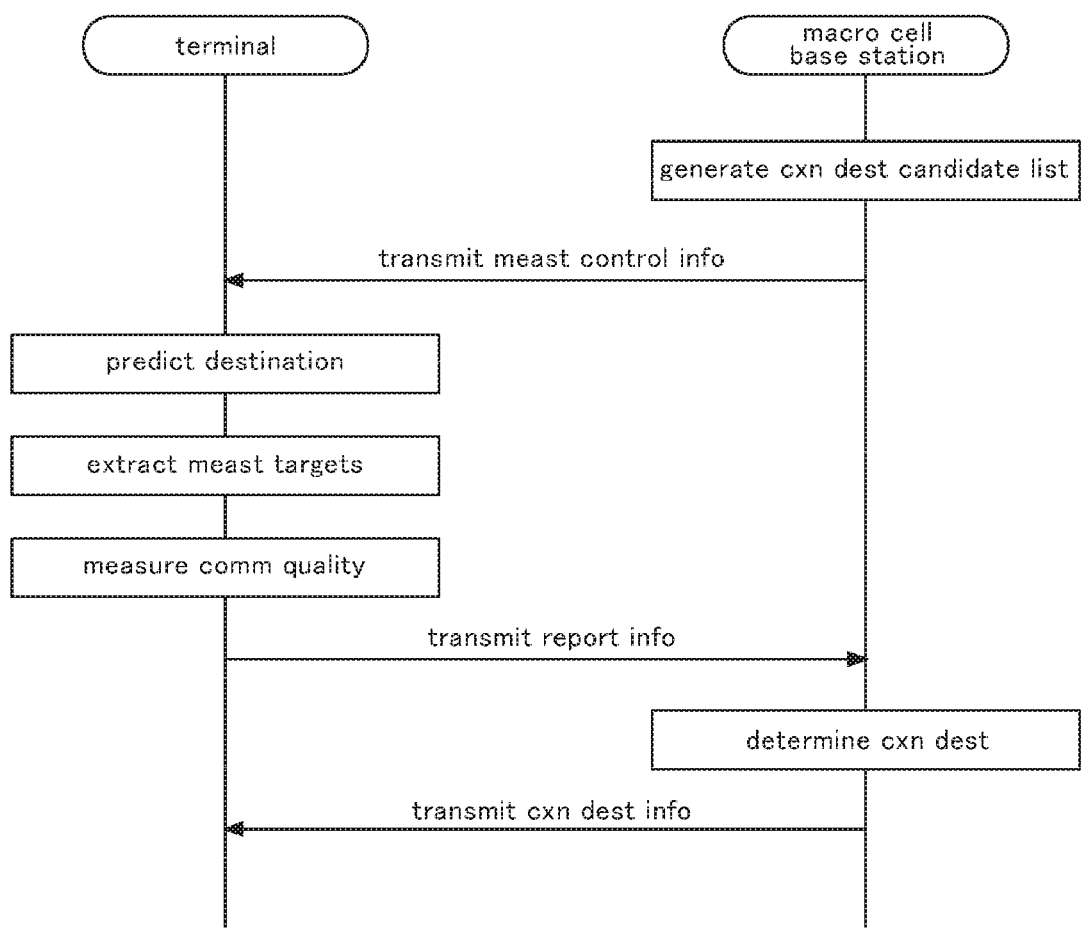
FIG. 2 is a sequence diagram showing an outline of operations of a terminal 1 and a macro cell base station 2.

Next, operations performed by the terminal 1 and the macro cell base station 2 will be described. FIG. 2 is a sequence diagram showing an outline of operations of the terminal 1 and the macro cell base station 2.

The macro cell base station 2 first generates a connection destination candidate list, in which base stations 2 to 5, which are connectable to the terminal 1 that is a terminal of interest, are listed as connection destination candidates. Then, the macro cell base station transmits measurement control information including the connection destination candidate list to the terminal 1.

Upon receiving the measurement control information transmitted from the macro cell base station 2, the terminal 1 predicts one or more mesh element areas to be destination areas of the terminal based on a moving state of the terminal 1, and extracts connection destination candidates as targets for communication quality measurement based on the historical information on each of the mesh element areas to be the destination areas and the connection destination candidate list included in the measurement control information. Next, the terminal measures a communication quality or communication qualities (e.g. received power) associated with the extracted measurement target candidates. Then, the terminal transmits report information to the macro cell base station 2, where the report information includes results of communication quality measurement associated with the extracted connection destination candidates.

Upon receiving the report information transmitted from the terminal 1, the macro cell base station 2 determines the connection destination of the target terminal 1 based on the report information. Then, the macro cell base station 2 transmits to the terminal 1 connection destination information on the base stations 2 to 5 determined as the connection destinations.

Figure 3:
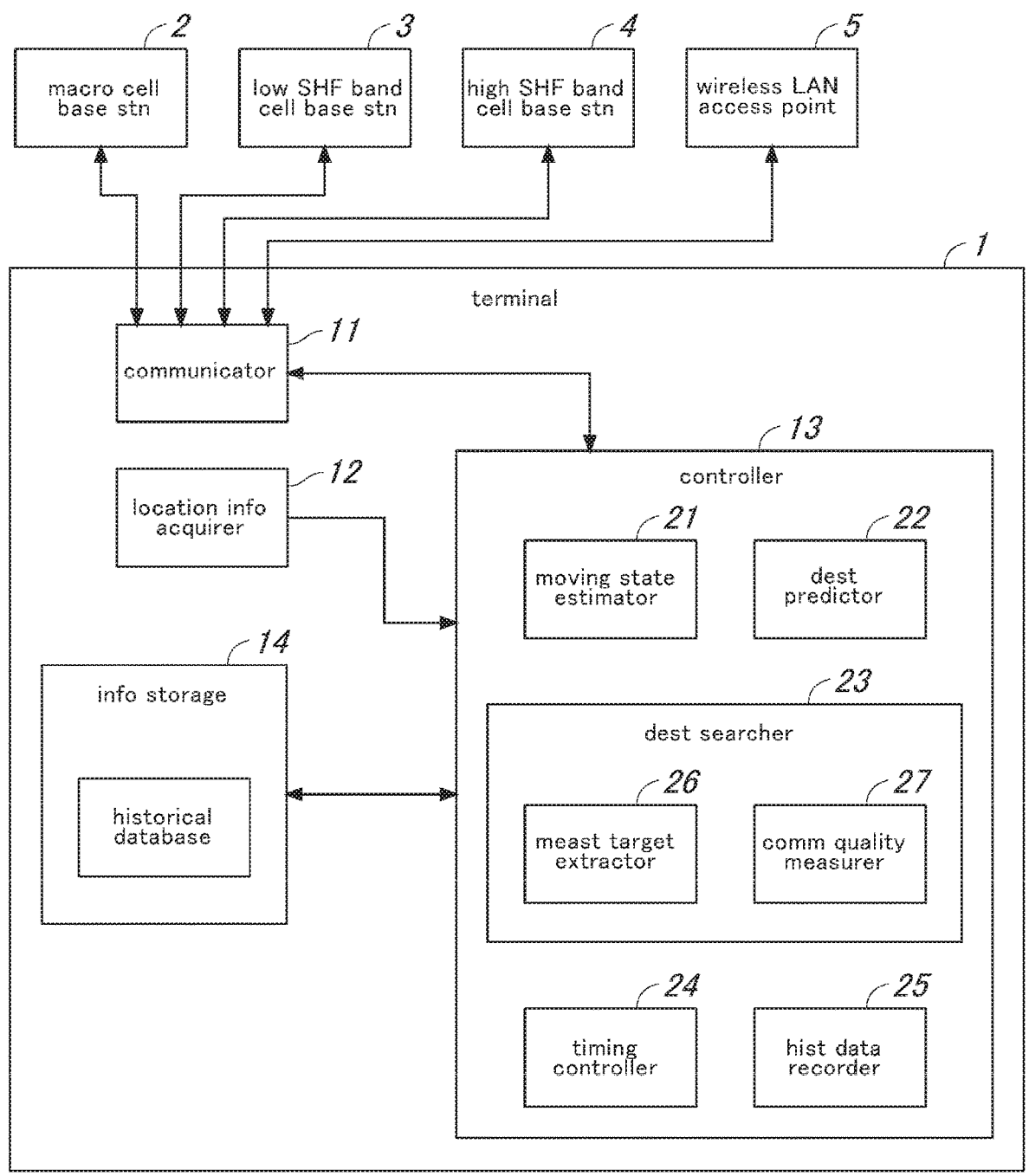
FIG. 3 is a diagram showing a general configuration of the terminal 1.

Next, a general configuration of the terminal 1 will be described. FIG. 3 is a diagram showing the general configuration of the terminal 1.

The terminal 1 includes a communicator 11, a location information acquirer 12, a controller 13, and an information storage 14.

The communicator 11 communicates with the macro cell base station 2, the low SHF band base station 3, the high SHF band base station 4, and the wireless LAN base station 5 (access point).

The location information acquirer 12 acquires location information on the terminal 1 by using a satellite positioning system such as a GPS (Global Positioning System).

The information storage 14 stores information on a moving speed and a moving direction of the terminal 1 acquired by the controller 13, information on the historical database managed by the controller 13, programs executable by a processor, which implements the controller 13, and any other type of information.

The controller 13 includes a moving state estimator 21, a destination predictor 22, a destination searcher 23, a timing controller 24, and a historical data recorder 25. The controller 13 is implemented by the processor, and each part of the controller 13 is implemented by causing the processor to execute a prescribed program stored in the information storage 14.

The moving state estimator 21 obtains current location information from the location information acquirer 12 and also obtains past location information from the information storage 14, and then, the moving state estimator 21 estimates a moving speed and a moving direction as a current moving state of the terminal 1 based on the location information and the past location information. The moving state estimator may estimate a moving state from a latitude, a longitude and an altitude as the location information, or only from a latitude and a longitude on a horizontal plane. Alternatively, the moving state estimator may count the number of times of cell switching and/or cell reselection, and the estimate a moving state from the counted number of times.

The destination predictor 22 predicts, based on the moving state (moving speed and moving direction) of the terminal 1 acquired by the moving state estimator 21, one or more target mesh element areas (destination areas), which the terminal 1 is expected to enter in the future.

The destination searcher 23 is configured to search for an optimum connection destination, and includes a measurement target extractor 26 and a communication quality measurer 27.

The measurement target extractor 26 obtains historical information on the target mesh element areas, which historical information has been acquired by the destination predictor 22, from a historical database of the information storage 14, and extracts connection destination candidates as targets for communication quality measurement based on the historical information on the target mesh element areas.

The communication quality measurer 27 measures a communication quality (or communication qualities) associated with the connection destination candidates extracted as targets for communication quality measurement by the measurement target extractor 26. In the present embodiment, the communication quality measurer measures a received power as a communication quality of each measurement target.

The timing controller 24 performs, based on the moving state (moving speed and moving direction) of the terminal 1 acquired by the moving state estimator 21 and on whether or not there is a difference between a frequency of the current connection destination and that of each connection destination candidate as a target for communication quality measurement, a connection destination search operation; that is, determining timing (position) to start the extraction of one or more targets for communication quality measurement performed by the measurement target extractor 26, and timing to start the communication quality measurement performed by the communication quality measurer 27. At the timing to start the connection destination search operation, the timing controller 24 causes the measurement target extractor 26 to extract one or more targets for communication quality measurement, and subsequently causes the communication quality measurer 27 to perform the communication quality measurement.

At the timing when the terminal 1 is located in one mesh element area, the historical data recorder 25 acquires information on the current communication status (connection destination information and communication quality information), and then records the information into the historical database as historical information for that mesh element area. By periodically performing this recordation of historical information, historical information associated with all the mesh element areas through which the terminal 1 passes can be recorded into the historical database.

Figure 4:
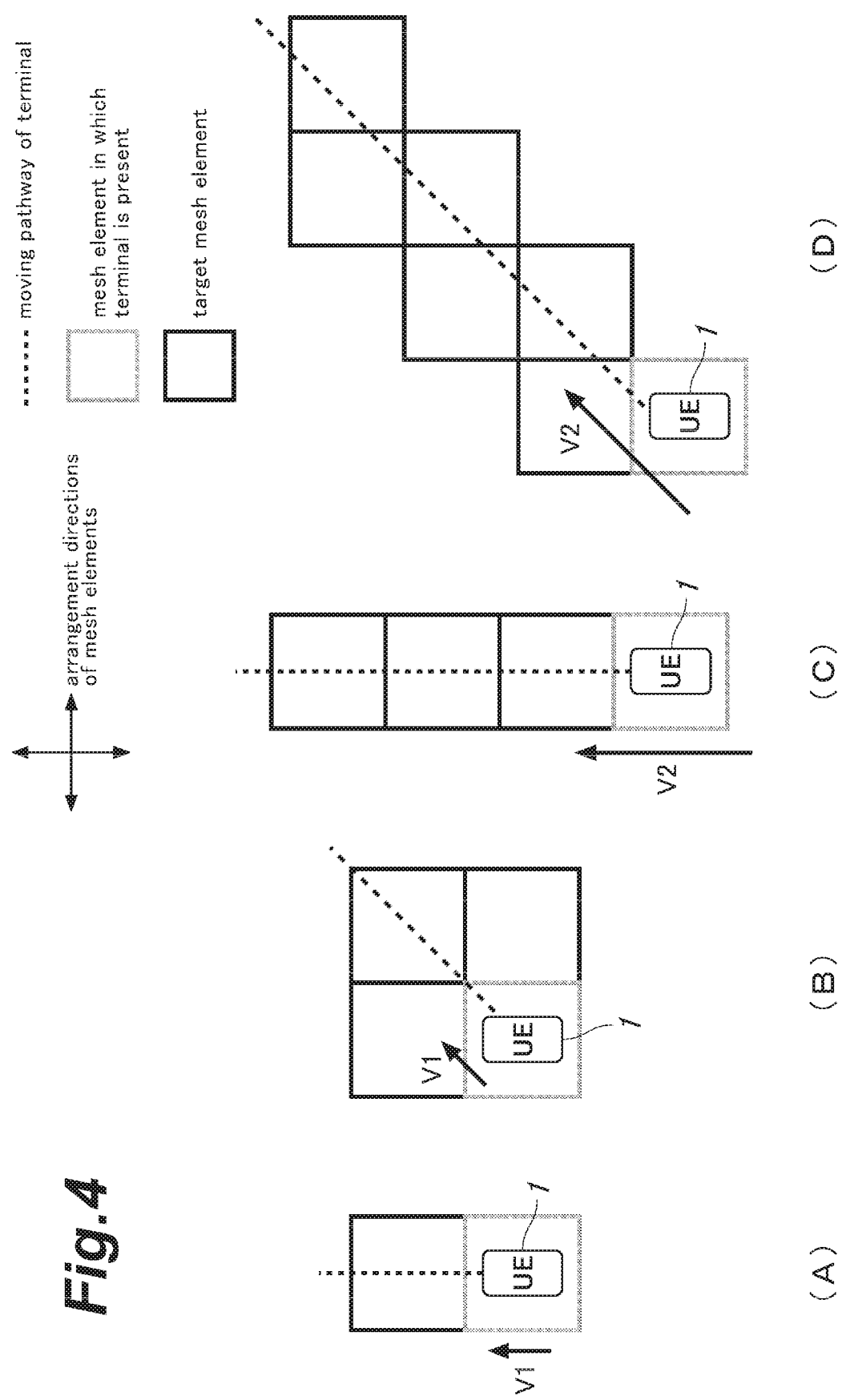
FIG. 4 is an explanatory view showing an outline of processing operations performed by a destination predictor 22.

Next, processing operations performed by the destination predictor 22 will be described. FIG. 4 is an explanatory view showing an outline of processing operations performed by the destination predictor 22.

In the present embodiment, the terminal performs the connection destination search operation; that is, by referring so the historical information for each mesh element area recorded in the historical database, the terminal extracts connection destination candidates as targets for communication quality measurement, and measures a communication quality (or communication qualities) associated with the connection destination candidates. In the present embodiment, under the condition that the terminal 1 refers to historical information associated with the current mesh element area in which the terminal 1 is currently located, the terminal can pass through the mesh element area referred by the terminal before the communication quality measurement is completed, thereby wasting the connection destination search operation which the terminal has been performing.

In view of this problem, in the present embodiment, the destination predictor 22 predicts one or more target mesh element areas, which are to be future destination areas of the terminal 1, and by referring to the historical information associated with the one or more target mesh element areas, the terminal extracts connection destination candidates as targets for communication quality measurement, and measures a communication quality (or communication qualities) associated with each of the connection destination candidates.

In the present embodiment, the terminal determines the one or more target mesh element areas based on the moving speed and the moving direction of the terminal 1 acquired by the moving state estimator 21.

When that the moving speed of the terminal 1 is slow, a mesh element area adjacent to the current mesh element area in which the terminal 1 is currently located is chosen as a target mesh element area.

In the example shown in FIG. 4 (A), the moving speed of the terminal 1 is slow and the terminal 1 moves in a mesh element area in a parallel direction relative to one of the arrangement directions of the mesh element areas (a direction parallel to one of the arrangement directions of the mesh element areas which are vertically and horizontally arranged). In this case, the terminal chooses one mesh element area that is located in the moving direction of the terminal 1 and adjacent to the mesh element area in which the terminal 1 is currently located, which means the number of a target mesh element area is one (1). It should be noted that, although each mesh element area has a square shape in this example, the shape of mesh element area may be a circle, an ellipse, or any other suitable shape.

In the example shown in FIG. 4 (B), the moving speed of the terminal 1 is slow and the terminal 1 moves in a mesh element area in a diagonal (inclined) direction relative to one of the arrangement directions of the mesh element areas (a direction not parallel to one of the arrangement directions of the mesh element areas which are vertically and horizontally arranged). In this case, the terminal chooses three mesh element areas that are located in the moving direction of the terminal 1 and adjacent to the mesh element area in which the terminal 1 is currently located, which means the number of target mesh element areas is three (3).

When the moving speed of the terminal 1 is high and the terminal chooses only one or more mesh element areas that is adjacent to the mesh element area in which the terminal 1 is currently located, the terminal may pass through the chosen one or more mesh element areas before the connection destination search operation is completed. For this reason, the terminal also chooses, in addition to the mesh element areas adjacent to the mesh element area in which the terminal 1 is currently located, one or more mesh element areas that are located ahead of the movement of the terminal in the moving direction.

In the example shown in FIG. 4 (C), the moving speed of the terminal 1 is high and the terminal 1 moves in a mesh element area in a parallel direction relative to one of the arrangement directions of the mesh element areas (a direction parallel to one of the arrangement directions of the mesh element areas which are vertically and horizontally arranged). In this case, the terminal chooses three mesh element areas that are sequentially located ahead of the movement of the terminal 1 in the moving direction, which means the number of target mesh element areas is three (3).

In the example shown in FIG. 4 (D), the moving speed of the terminal 1 is high and the terminal 1 moves in a mesh element area in a diagonal (inclined) direction relative to one of the arrangement directions of the mesh element areas (a direction not parallel to one of the arrangement directions of the mesh element areas which are vertically and horizontally arranged). In this case, the terminal chooses six mesh element areas that are sequentially located ahead of the movement of the terminal 1 in the moving direction, which means the number of target mesh element areas is six (6).

In the high-speed examples shown in FIGS. 4 (C) and 4 (D), it is assumed that the moving speed V2 is twice as higher as the low moving speed V1 shown in FIGS. 4 (A) and 4 (B).

As described above, in the present embodiment, the terminal chooses, based on the moving speed and the moving direction of terminal 1, one or more mesh element areas to be entered in future as target mesh element areas, and then, by referring to the historical information associated with the target mesh element areas, the terminal extracts connection destination candidates as targets for communication quality measurement.

When the moving speed of terminal 1 is fast, the terminal chooses mesh element areas so as to make the destination area larger than when the moving speed is slow. In other words, the terminal sets a greater number of mesh element areas than when the moving speed is low. As a result, when the moving speed is fast, the terminal can start the connection destination search operation (measurement target extraction and communication quality measurement) at an earlier timing, and thus the terminal can avoid performing a connection destination search operation to be wasted when the terminal pass through a destination area before the connection destination search operation is completed.

In other embodiments, when the moving speed of terminal 1 is fast, the terminal may set each mesh element area larger than when the moving speed is slow. In this case, the historical data recorder 25 changes the size of each mesh element area (See FIG. 13).

In the present embodiment, when the terminal 1 moves, as shown in FIGS. 4 (B) and 4 (D), in a mesh element area in a diagonal (inclined) direction relative to one of the arrangement directions of the mesh element areas (a direction not parallel to one of the arrangement directions of the mesh element areas which are vertically and horizontally arranged), the terminal sets a greater number of mesh element areas when the terminal 1 moves in a mesh element area in a parallel direction relative to one of the arrangement directions of the mesh element areas (a direction parallel to one of the arrangement directions of the mesh element areas which are vertically and horizontally arranged). This can prevents the terminal from missing one or more target mesh element areas, thereby enabling the terminal to properly perform a connection destination search.

Next, the historical database to which the measurement target extractor 26 refers will be described. FIG. 5 is an explanatory view showing an example of historical database including recorded data.

This historical database includes a connection destination identifier, a frequency, and a communication scheme as connection information for each mesh ID, as well as a received power, a throughput, and a communication data amount as communication quality information for each mesh ID.

A mesh ID is an identification number assigned to each mesh element area. In addition, a connection destination identification is identification information on the base stations 2 to 5 as connection destinations. For example, in cellular communication schemes, a cell ID is often used as a connection destination identifier, and in wireless LANs, an SSID is often used as a connection destination identifier.

The historical database may include location information (a latitude, a longitude and an altitudes) of the terminal 1. The types of communication quality information are not limited to a received power, a throughput and a communication data amount, and may include an interference amount, a cutting rate, an error rate, a connection rate or other parameter.

In addition, historical information may be recorded into the historical database for each time period of day. This configuration enables the terminal to make a connection with an optimal connection destination in cases where the optimal connection destination varies depending of the time period of day.

For a section where the terminal 1 has not entered in the past, no historical information on mesh element areas is recorded as there is no record of communication in the section. In this case, historical information may be interpolated using the historical information on the mesh element areas located around those mesh element areas with no recorded historical information.

The historical database may be shared with another terminal 1. For example, historical information on the respective terminals 1 is uploaded to a server, which integrates the historical information, and distributes the integrated historical information to the respective terminals 1. This allows each terminal 1 to use the historical information on a mesh element area in a section where the terminal 1 has not entered in the past. In other embodiments, in a section with no recorded historical information, the terminal 1 may perform the operations in a conventional manner (all the connection destination candidates are measured) and accumulate historical information.

The measurement target extractor 26 acquires the historical information on the target mesh element areas acquired by the destination predictor 22 from the historical database and extracts connection destination candidates as targets for communication quality measurement based on the historical information on the target mesh element areas.

In this case, when the moving speed of the terminal 1 is fast, as shown in FIGS. 4 (C) and 4 (D), the terminal sets a greater number of target mesh element areas than when the moving speed is slow, and the terminal extracts targets for measurement by referring to the historical information on the target mesh element areas at shorter time intervals. Also, as shown in FIGS. 4 (B) and 4 (D), when the terminal 1 moves in a mesh element area in a diagonal (inclined) direction relative to one of the arrangement directions of the mesh element areas (a direction not parallel to one of the arrangement directions of the mesh element areas which are vertically and horizontally arranged), the terminal sets a greater number of target mesh element areas at shorter time intervals than when the terminal 1 moves in a mesh element area in a parallel direction relative to one of the arrangement directions of the mesh element areas (a direction parallel to one of the arrangement directions of the mesh element areas which are vertically and horizontally arranged). As a result, the terminal can properly extract one or more targets for measurement by referring to the historical information on each target mesh element area.

Also, in extracting targets for measurement by referring to the historical database, when a target mesh element area has communication histories associated with two or more connection destinations, it is desirable to narrow down the number of targets for communication quality measurement to one (1) in order to shorten the time required for measurement. One possible way of narrowing down the number of targets is to extract a connection destination which is expected to achieve a highest communication quality. In some embodiments, the communication quality may be determined based on the expected throughput. In other embodiments, the communication quality may be determined based on the received power. Alternatively, the communication quality may be determined based on the communication data amount or other communication quality information.

In some embodiment, a connection destination may be chosen based on two or more communication qualities. In this case, one possible way of narrowing down the number of targets for measurement is to calculate an evaluation value representing the total communication quality from the information on the two or more communication qualities, and extract the target connection destination based on the evaluation value. In some embodiment, the evaluation value may be calculated by weighting pieces of information on respective communication qualities. For example, the evaluation value may be one calculated by weighting pieces of the information where the weighting coefficient of the piece of information regarding throughput is 3 and that of the piece of information regarding the received power is 1.

Furthermore, in cases where the historical information on a target mesh element area is associated with two or more connection destinations and the connection destinations are expected to achieve the same communication quality or provide the same evaluation value calculated from multiple communication qualities as a basis of evaluation, the terminal may be configured to extract two targets for measurement. In this case, the terminal is preferably configured to assign priorities to the respective connection destination candidates based on the information on one of the communication qualities or the evaluation value, and measure the communication qualities associated with the connection destination candidates in the order of the priority.

Also, in cases where the historical information on a target mesh element area is associated with multiple connection destinations, when the moving speed is fast, the terminal is preferably configured to extract a greater number of targets for measurement than when the moving speed is slow. When the terminal 1 moves in a mesh element area in a diagonal (inclined) direction relative to one of the arrangement directions of the mesh element areas (a direction not parallel to one of the arrangement directions of the mesh element areas which are vertically and horizontally arranged), the terminal 1 is preferably configured to extract a greater number of targets for measurement than when the terminal moves in a mesh element area in a parallel direction relative to one of the arrangement directions of the mesh element areas (a direction parallel to one of the arrangement directions of the mesh element areas which are vertically and horizontally arranged). As a result, the terminal can avoid re-extract targets for measurement, thereby enabling the terminal to efficiently perform a connection destination search operation.

In cases where the historical information on a target mesh element area is associated with multiple connection destinations, although the terminal can avoid re-extract targets for measurement by increasing the number of targets for measurement, an increased number of targets for measurement results in a longer connection destination search delay time, and an higher moving speed of the terminal 1 leads to a longer moving distance of the terminal during a connection destination search delay time, resulting in that the terminal pass through a destination area before the connection destination search operation is completed and the terminal cannot always make a connection with an optimal connection destination. In this way, it is not always possible to determine an optimum extraction number of targets for measurement simply from the number of connection destinations in a target mesh element area which the historical information is associated with or the moving speed of the terminal 1. Thus, in some embodiments, a simulation may be conducted to determine an optimal combination(s) of the moving speed of the terminal 1, the number of connection destinations in a target mesh element area which the historical information associated with, the number of extracted targets for measurement, and the search delay time per connection, so that the terminal can extract targets for measurement based on the result of the simulation.

Next, processing operations performed by the timing controller 24 will be described. FIG. 6 is an explanatory view showing examples of moving distances of the terminal 1 during connection destination search delay times for each moving speed of the terminal 1. FIG. 7 is an explanatory view showing examples of timing to start a connection destination search operation in the terminal 1.

In the present embodiment, the terminal 1 acquires the historical information on a target mesh element area from the historical database, and by referring to the historical information on the target mesh element area, the terminal extracts a connection destination candidate as a target for communication quality measurement and measures communication quality (communication qualifies) associated with the target connection destination candidates.

In the present embodiment, the terminal is allowed to complete a connection destination search operation (measurement target extraction and communication quality measurement operations) before entering a target mesh element area, thereby enabling the terminal to make a connection with an optimal connection destination immediately after entering the target mesh element area. One possible way to implement this system is to configure the timing controller to determine timing (position) of start of a connection destination search operation by considering a moving distance of the terminal 1 during a connection destination search delay time (time required to perform the connection destination search operation). That is, the timing controller is configured to start the connection destination search operation at the timing when a distance from the terminal 1 to a target mesh element area becomes equal to the moving distance of the terminal 1 during the connection destination search delay time.

As shown in FIG. 6, as the moving speed of terminal 1 is fast, the moving distance of the terminal 1 becomes longer during the connection destination search delay time.

Moreover, in cases where the frequency of the current connection destination is different from that of a connection destination as a target for measurement (hereinafter also referred to as "different frequency case"), the connection destination search delay time is longer than that in case where the frequency of the current connection destination is the same as that of a target for measurement (hereinafter also referred to as "same frequency case"). In the example shown in FIG. 6, it is assumed that, in the same frequency case, the connection destination search delay time is one (1) second and, in the different frequency case, the connection destination search delay time is 3.85 seconds. It is also assumed that the target for measurement uses one frequency.

As described above, the moving distance of the terminal 1 during a connection destination search delay time changes according to the moving speed of the terminal 1, and the connection destination search delay time in the same frequency case differs from that in the different frequency case. Thus, in the present embodiment, the timing (position) of start of the connection destination search operation is determined depending on the moving speed of terminal 1 and whether the target for measurement uses the same frequency or a different frequency. Specifically, in the same frequency case, the terminal starts a connection destination search operation at the timing (position) determined by considering the connection destination search delay time in the same frequency case and the distance of the movement of the terminal for its moving speed, whereas, in the different frequency case, the terminal starts a connection destination search operation at the timing (position) determined by considering the connection destination search delay time in the different frequency case and the distance of the movement of the terminal for its moving speed.

FIGS. 7 (A-1) and 7 (A-2) show an example in which the moving speed of the terminal 1 is 3 km/h (0.8 m/s), and FIGS. 7 (B-1) and 7 (B-2) show an example in which the moving speed of the terminal 1 is 10 km/h (2.8 m/s). It is assumed that the mean element area size (the length of one side) is 10 m.

As shown in FIG. 7 (A-1), when the moving speed is 3 km/h and the target for measurement uses the same frequency, the terminal starts the connection destination search operation (measurement operation) at the position where the distance to the target mesh element area is 0.8 m. As shown in FIG. 7 (A-2), when the moving speed is 3 km/h and the target for measurement uses a different frequency, the terminal starts the connection destination search operation (extraction/measurement operations) at the position where the distance to the target mesh element area is 3.2 m.

In the other example, as shown in FIG. 7 (B-1), when the moving speed is 10 km/h and the target for measurement uses the same frequency, the terminal starts the connection destination search operation (measurement operation) at the position where the distance to the target mesh element area is 2.8 m. As shown in FIG. 7 (B-2), when the moving speed is 10 km/h and the target for measurement uses a different frequency, the terminal starts the connection destination search operation (extraction/measurement operations) at the position where the distance to the target mesh element area is 10.7 m. In this case, the terminal starts the connection destination search operation at the timing when the terminal 1 is located at the position behind two mesh element areas from the target mesh element area.

In some cases, when the terminal extracts two or more connection destination candidates as targets for communication quality measurement, the two or more frequencies are to be used in measurement terminal. In such cases, the terminal controls timing to start the connection destination search operation (extraction/measurement operations) according to the number of frequencies to be used in measurement. For example, when two frequencies are used in the extraction and measurement operations, the terminal starts the connection destination search operation (extraction/measurement operations) at the timing (position) where the distance to the target mesh element area is as twice as the distance in the case that only one frequency is used in the extraction and measurement operations. For example, in the same manner as the example shown in FIG. 7 (A-2), when the moving speed of the terminal 1 is 3 km/h, the terminal 1 starts the connection destination search operation (extraction/measurement operations) at the timing when the distance to the target mesh element area is 6.4 m.

Figure 8:
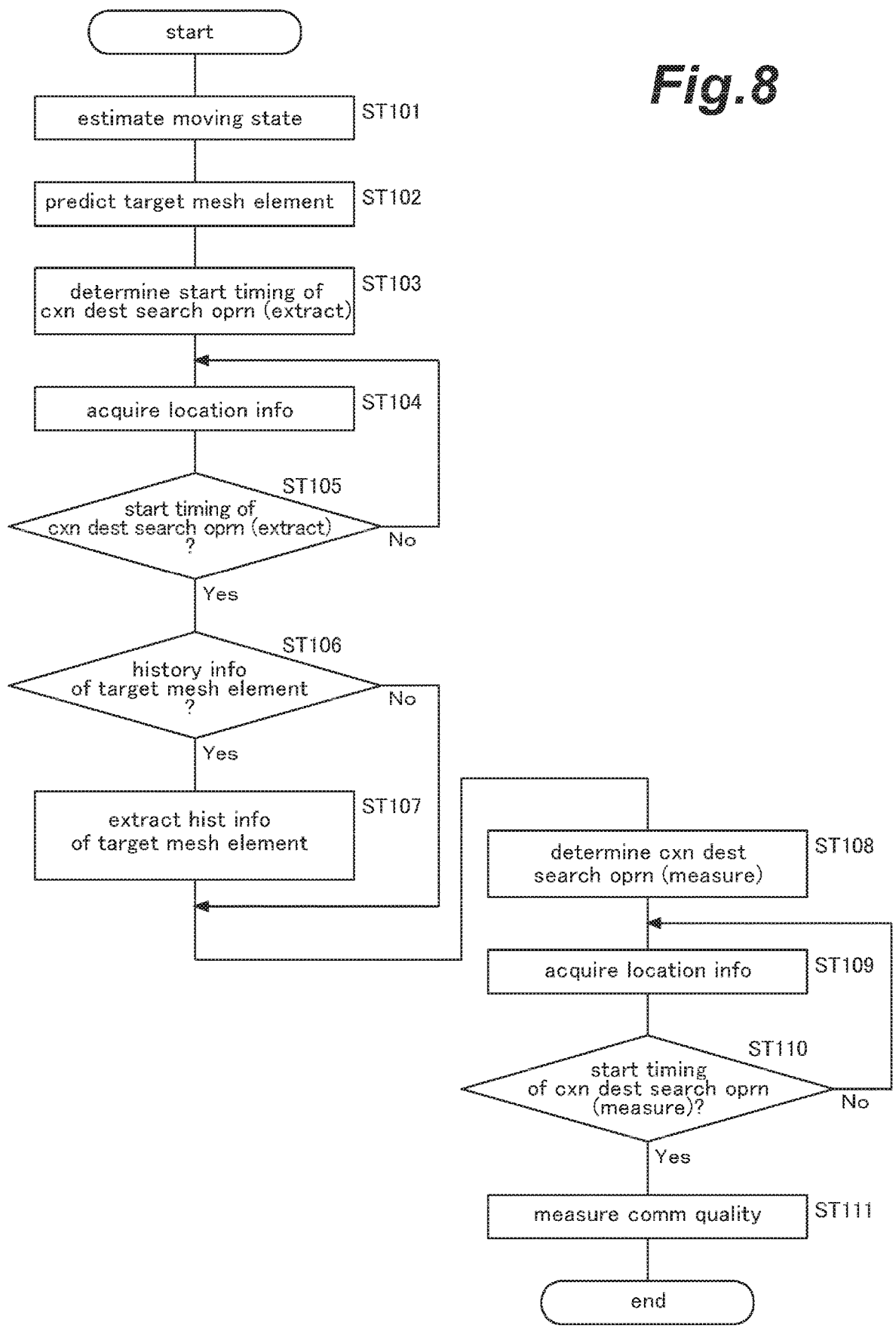
FIG. 8 is a flowchart showing a processing operation procedure performed by the terminal 1.

Next, a processing operation procedure performed by terminal 1 will be described. FIG. 8 is a flowchart showing a processing operation procedure performed by the terminal 1.

In the terminal 1, the moving state estimator 21 acquires current location information from the location information acquirer 12, acquires past location information from the information storage 14, estimates the moving state (moving speed and moving direction) of the terminal 1 based on the current location information and the past location information (ST 101). Next, the destination predictor 22 predicts a target mesh element area to be a destination based on the moving state of the terminal 1 (ST 102). Next, the timing controller 24 determines the timing (position) at which a connection destination search operation (extraction operation) starts (ST 103).

Next, the controller acquires the current location information from the location information acquirer 12 (ST 104), and determines, based on the current location information, whether or not it is timing to start the connection destination search operation (extraction operation) (ST 105).

If it is timing to start the connection destination search operation (extraction operation) (Yea in ST 105), the terminal determines whether or not the historical database includes historical information on the target mesh element area. If the historical database includes the historical information (Yes in ST 106), the measurement target extractor 26 refers to the historical information on the target mesh element area and extracts a connection destination candidate (a frequency for measurement) as a target for measurement (ST 107).

Next, the timing controller 24 determines the timing (position) at which the terminal starts the connection destination search operation (measurement operation) (ST 108). The controller acquires the current location information from the location information acquirer 12 (ST 109) and determines whether it is timing to start the connection destination search operation (measurement operation) based on the correct location information (ST 110). If it is timing when the terminal starts the connection destination search operation (measurement operation) (Yes in ST 110), the communication quality measure 27 measures the communication quality associated with the extracted connection destination candidate (ST 111).

If it is not timing to start the connection destination search operation (No in ST 105), the terminal repeats the acquisition of location information (ST 104) until it is timing to start the connection destination search operation. If there is no historical information on the target mesh element area (No in ST 106), the terminal does not perform the extraction of a target for measurement based on historical information (ST 107). In this case, the terminal chooses target connection destinations as targets for measurement from the connection destination candidate list obtained from the macro cell base station 2.

In the communication quality measurement (ST 108), if the measured communication quality does not meet a prescribed criterion, the measurement target extractor 26 again performs the extraction of a connection destination candidate as a target for measurement. In other words, the measurement target extractor extracts another connection destination candidate as a target for measurement in the historical information on the target mesh element area. If all the connection destination candidates in the historical information on the target mesh element area do not meet the prescribed criterion, the measurement target extractor chooses a connection destination candidate from the connection destination candidate list obtained from the macro cell base station 2, and if all the connection destination candidates in the connection destination candidate list do not meet the prescribed criterion, the terminal transmits to the macro cell base station 2 report information indicating that there is no connectable connection destination.

Figure 9:
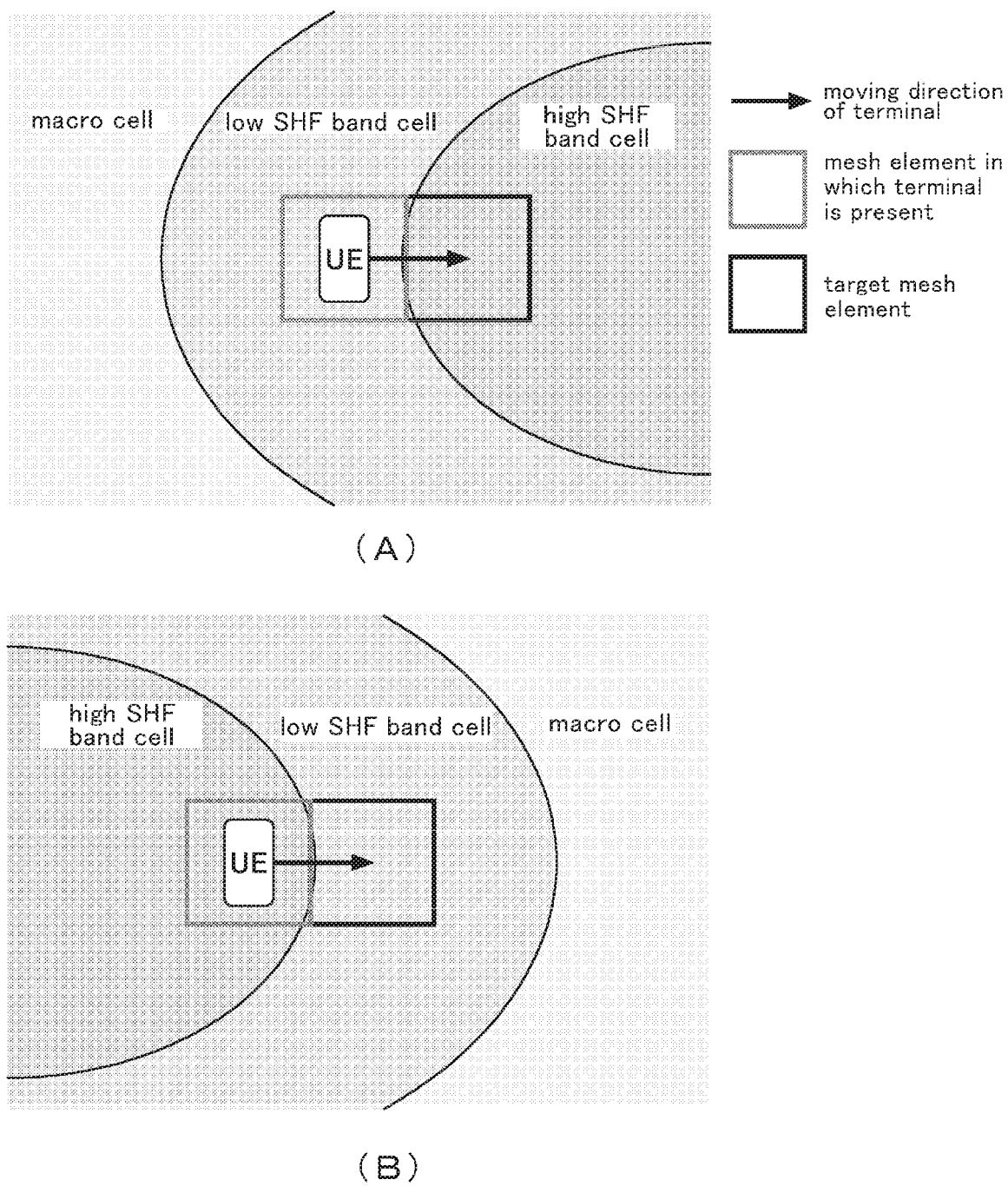
FIG. 9 is an explanatory view showing examples of effects achieved by the connection destination search operation.

Next, technical effects achieved by the connection destination search operation according to the present embodiment will be described. FIGS. 9 and 10 are explanatory views showing an example of the effects of the connection destination search operation.

In the example shown in FIGS. 9 (A) and 9 (B), the macro cell, the high SHF band cell and the low SHF band cell are overlapped with one another, the boundary of the high SHF band cell matches that of the mesh element area, and one of (i) the current mesh element area in which the terminal 1 is currently located and (ii) the target mesh element area is located outside the high SHF band cell and the other is located inside the high SHF band cell.

As shown in FIG. 9 (A), when the terminal 1 enters the high SHF band cell, the first priority of the extraction is given to the high SHF band cell and the second priority is given to the low SHF band cell in the historical information on the target mesh element area located in the high SHF band cell, and thus the high SHF band cell is extracted as a target for measurement. Since the terminal 1 is currently present only in the low SHF band cell and not in the high SHF band cell, the terminal cannot measure the communication quality associated with the high SHF band cell, resulting in that the terminal cannot complete the connection destination search operation at an earlier timing.

In the case of FIG. 9 (B), when the terminal 1 leaves the high SHF band cell, the first priority of the extraction is given to the high SHF band cell and the second priority is given to the low SHF band cell in the historical information on the mesh element area in which the terminal 1 currently is located, and the first priority of the extraction is given to the low SHF band cell and the second priority is given to the macro cell in the historical information on the target mesh element area. However, since the terminal 1 is currently present in all of the macro cell, the low SHF band cell and the high SHF band cell, the terminal 1 can measure the communication quality associated with the low SHF band cell in which the terminal is present and connected to the high SHF band cell in the mesh element area. This means that the terminal can start the connection destination search operation from when the terminal is located in the current mesh element area, and thus the terminal can complete the operation at an earlier timing and connect to the low SHF band immediately after leaving the high SHF band cell.

In the example shown in FIGS. 10 (A) and 10 (B), although the macro cell, the high SHF band cell and the low SHF band cell are overlapped with one another in same manner as the example shown in FIGS. 9 (A) and 9 (B), the boundary of the high SHF band cell does not match that of the mesh element area, and the mesh element area in which the terminal 1 is currently present extends over the boundary between the high SHF band cell and the low SHF band cell. FIGS. 10 (A) and 10 (B) shows the exemplary case in which the terminal 1 enters the high SHF band cell in the same manner as the example of FIG. 9 (A).

In the case, as shown in FIG. 10 (A), the first priority of the extraction is given to the low SHF band cell and the second priority is given to the high SHF band cell in the historical information on the target mesh element area. When the number of the extracted connection destination is one (1), a connection destination candidate as a target for measurement is extracted only from the low SHF band, and when the number of the extracted connection destinations is two (2), one of the connection destination candidates as targets for measurement is extracted from the low SHF band and the other is extracted from the high SHF band. In cases where the next target mesh element area is also included in the extraction target area, connection destination candidates as targets for measurement are extracted from both the low SHF band and the high SHF band cells. In FIG. 10 (B), since the mesh element area in which the terminal 1 is currently present extends over the boundary between the high SHF band cell and the low SHF band cell, connection destination candidates as targets for measurement can be extracted not only from the low SHF band but also from the high SHF band. This means that the terminal can start to measure the communication quality of a connection destination candidate in the high SHF band cell, and thus the terminal can complete the connection destination search operation at an earlier timing.

Figure 11:
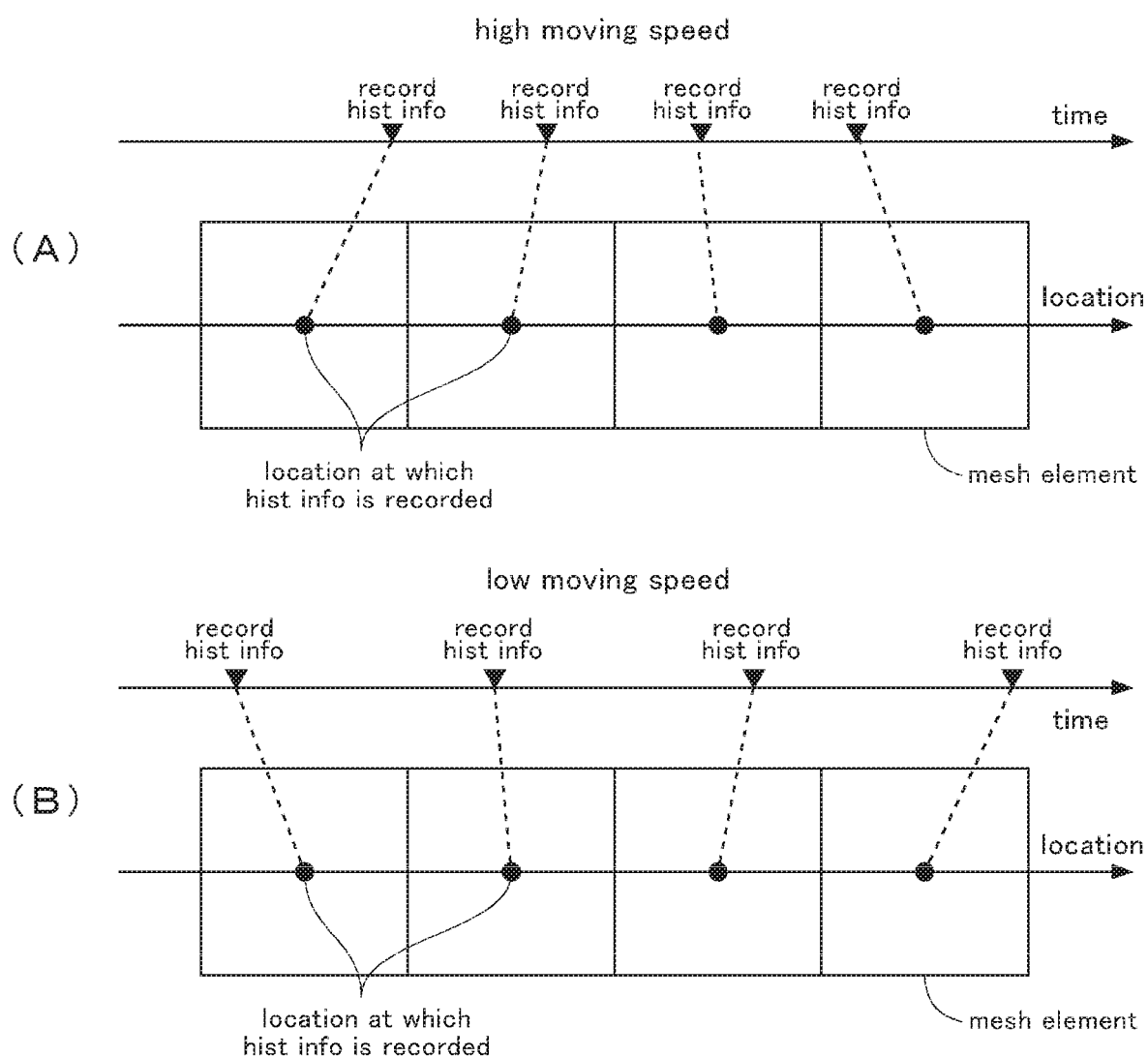
FIG. 11 is an explanatory view showing an outline of processing operations performed by a historical data recorder 25.

Next, processing operation performed by the historical data recorder 25 will be described. FIG. 11 is an explanatory view showing an outline of processing operations performed by a historical data recorder 25.

The historical data recorder 25 acquires information (connection destination information and communication quality information) on the communication status at the timing when the terminal 1 is located in a mesh element area, and records the information into the historical database as the historical information on the mesh element area. By periodically performing the recordation of historical information, the historical data recorder can acquire the historical information for each of the mesh element areas set for the section in which the terminal 1 enters into the historical database.

The period at which the historical data recorder performs the recordation of historical information may be set according to the mesh element area size, the connection destination search delay time, and/or the moving speed of the terminal 1.

In the example shown in FIG. 11, the period at which the historical data recorder performs the recordation of historical information is set according to the moving speed. As shown in FIG. 11 (A), when the moving speed is fast, the period at which the historical data recorder performs the recordation of historical information is set short. As shown in FIG. 11 (B), when the moving speed is slow, the period at which the historical data recorder performs the recordation or historical information is set long. Thereby, the mesh element area size can be unified regardless of the moving speed.

For example, in the case where the mesh element area size is 11.2 m and the connection destination search delay time is 1 s, when the moving speed of the terminal 1 is 10 km/h (2.8 m/s), the period at which the historical data recorder performs the recordation of historical information is set to be 4 s, and when the moving speed of the terminal 1 is 20 km/h (5.6 m/s), the period at which the historical data recorder performs the recordation of historical information is set to be 2 s. As a result, the recordation of historical information is performed at 11.2-meter intervals so that the historical information can be recorded one by one on each 11.2-meter size mesh element area.

In this way, when the terminal is configured to be capable of changing the period at which the recorder performs the recordation of historical information according to the moving speed so as to unify the mesh element area size, it is possible to record a certain number (one in FIG. 11) of piece(s) of historical information for each mesh element area, thereby reducing the storage capacity required for the historical database.

Next, another example of the historical database will be described. FIG. 12 is an explanatory view showing another example of historical database including recorded data.

As shown in FIG. 5, the historical database contains a connection destination identifier, a frequency, and a communication scheme as connection destination information recorded for each mesh ID. The historical database also contains a received power, a throughput, and a communication data amount as communication quality information for each mesh ID. In the example of FIG. 12, the historical database further contains the moving speed of the terminal 1 in addition to the connection destination information and the communication quality information.

In this way, as historical information is recorded for each moving speed of the terminal 1, the terminal can choose different optimal connection destinations for different moving speeds of the terminal 1 even when the terminal is located in the same mesh element area.

Figure 13:
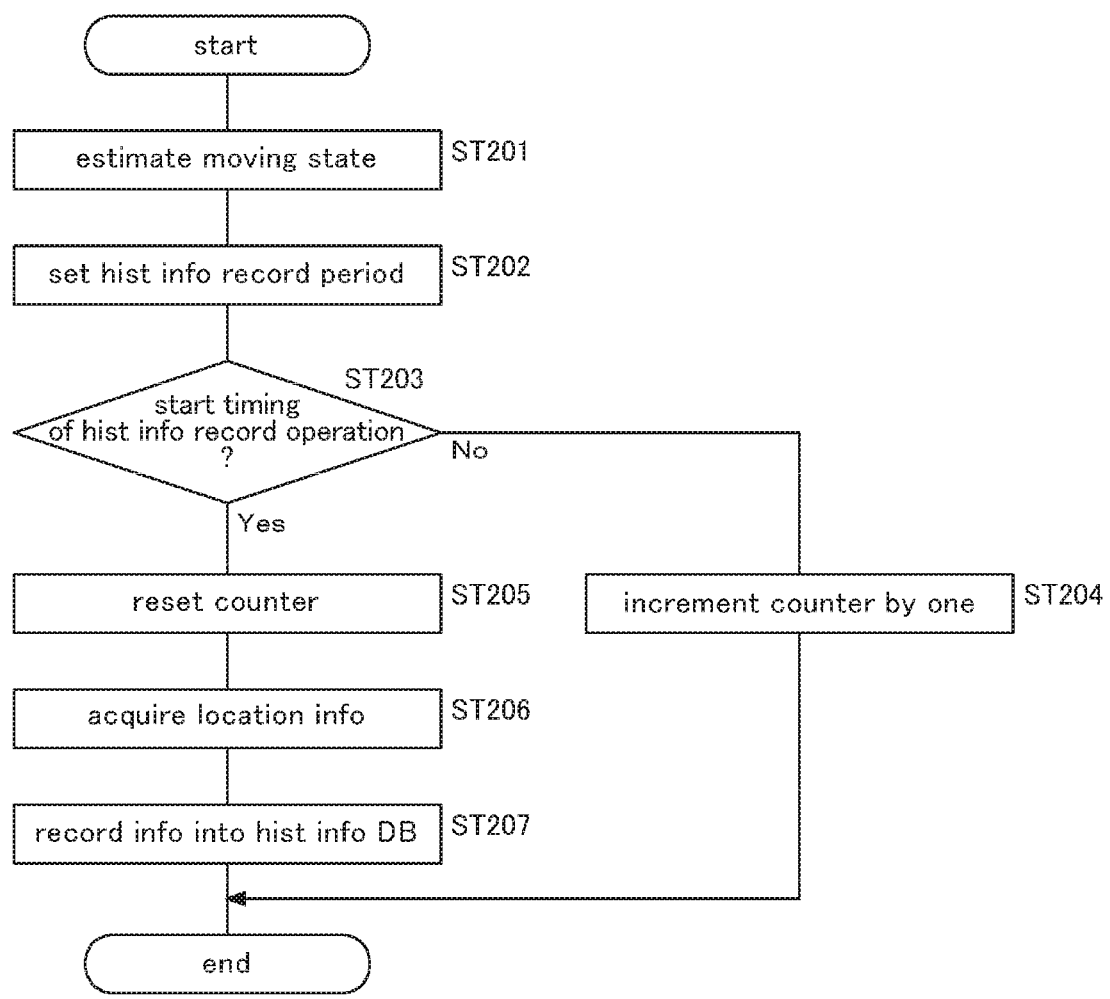
FIG. 13 is a flowchart showing a processing operation procedure performed by the historical data recorder 25.

Next, a processing operation procedure performed by the historical data recorder 25 will be described. FIG. 13 is a flowchart showing the processing operation procedure performed by the historical data recorder 25.

First, after the moving state estimator 21 acquires current location information from the location information acquirer 12 and also acquires past location information from the information storage 14, the moving state estimator 21 estimates a moving state (moving speed and moving direction) of the terminal 1 based on the current location information and the past location information (ST 201). Next, the historical data recorder 25 sets the period at which the historical data recorder performed the recordation of historical information based on the moving state of the terminal 1 (ST 202).

Next, the terminal determines whether or not it is the timing to perform the recordation of historical information based on whether or not the count value of a counter reaches a target value corresponding to the period at which the historical data recorder performs the recordation of historical information (ST 203). When it is not timing when the historical data recorder performs the recordation of historical information (No in ST 203), the counter is incremented by 1 (ST 204).

If it is timing when the historical data recorder performs the recordation of historical information (Yes in ST 203), the counter is reset (ST 205). Next, the controller acquires the current location information from the location information acquirer 12 (ST 206). Next, the controller determines the mesh element area in which the terminal 1 is located based on the current location information, and acquires current communication status information (connection destination information and communication quality information). Then, the recorder records the information along with the moving speed into the historical database as the historical information on a corresponding mesh element area (ST 207).

Next, another example of processing operations performed by the historical data recorder 25 will be described.

Figure 14:
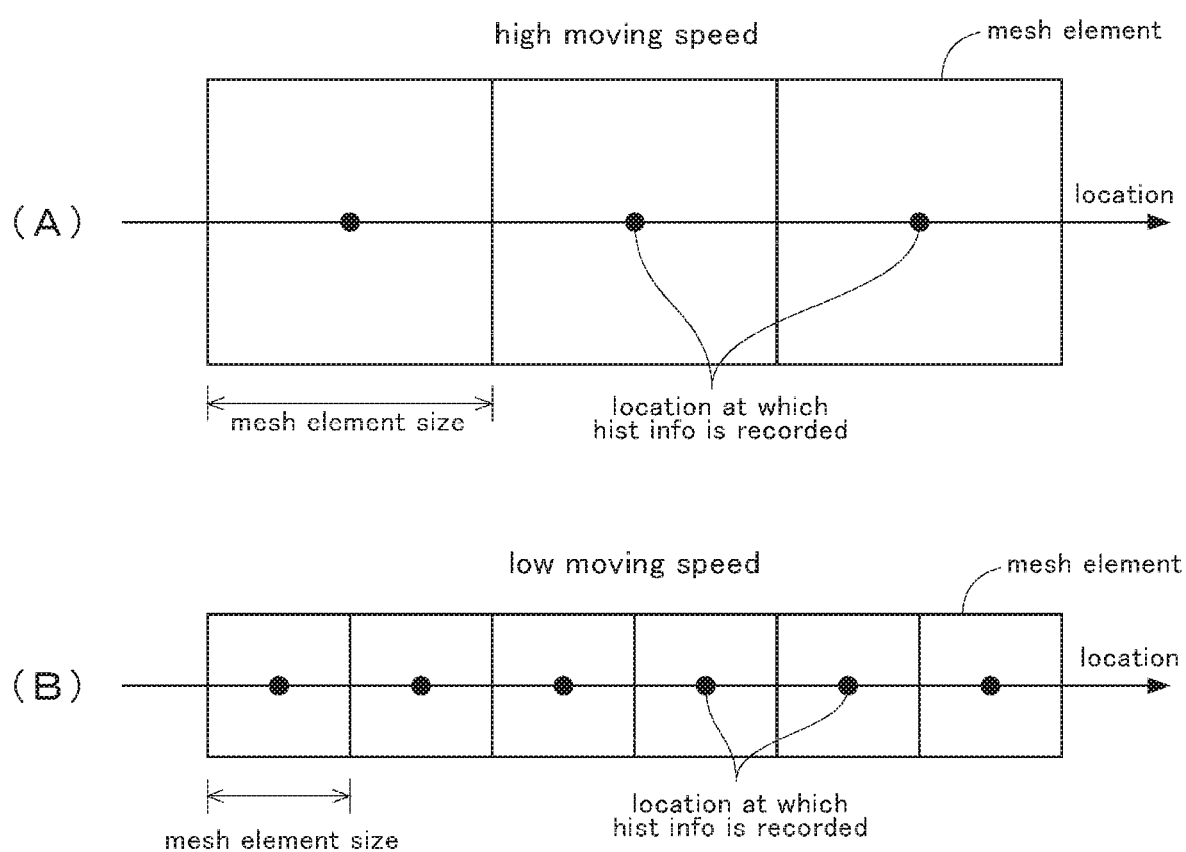
FIG. 14 is an explanatory view showing an outline of processing operations performed by the historical data recorder 25 according to another embodiment of the present invention.

FIG. 14 is an explanatory view showing an outline of the processing operations performed by the historical data recorder 25.

In the example shown in FIG. 11, the historical data recorder changes the period at which the historical data recorder performs the recordation of historical information depending on the moving speed of the terminal 1. In other embodiments, the historical data recorder may perform the recordation of historical information at a constant period. In this case, as shown in FIG. 14, the mesh element area size changes according to the moving speed of the terminal 1. Specifically, when the moving speed of the terminal is high, the mesh element area size is increased, and when the moving speed of the terminal is low, the mesh element area size is decreased.

In the example shown in FIG. 14, the moving speed during the high speed movement of the terminal shown in FIG. 14 (A) is twice as high as the moving speed in the low moving speed case shown in FIG. 14 (B). For example, in the case where the period at which the historical data recorder performs the recordation of historical information is 1 s, when the moving speed is 10 km/h (2.8 m/s), the recordation of historical information is performed at 2.8-meter intervals, and thus the mesh element area size is 2.8 m. When the moving speed is 20 km/h (5.6 m/s), the recordation of historical information is performed at 5.6-meter intervals, and thus the mesh element area size is 5.6 m.

In this way, since the mesh element area size is increased when the moving speed of the terminal is high, it becomes possible to reduce the storage capacity required for the historical database. The increase in the mesh element area size prevents the terminal from performing the connection destination search operation at an excessive frequency, thereby enabling the power saving of the terminal 1. The increase in the mesh element area size extends the intervals at which the terminal performs the connection destination search operation and causes no practical trouble because, when the moving speed is high, the time period in which the terminal is present in each mesh element area is short.

When the terminal performs the recordation of historical information at a constant period, the interval at which the terminal performs the recordation of historical information varies depending on the moving speed of terminal 1, and the mesh element area size varies accordingly. Thus, when the moving speed of terminal 1 can vary in the same section, it is necessary to form historical database for each moving speed.

However, it can be assumed that the change in the moving speed, which varies depending on the location, is generally constant because of the user's behavioral pattern. Specifically, the sections where a user moves on foot and those where the user moves in a vehicle are generally the same, and, in the sections where the user moves on foot, the terminal moves at a lower moving speed and, in the sections where the user moves in the vehicle, the terminal moves at a higher moving speed. As a result, in a single historical database, recorded information indicates that the mesh element area size is small in sections where a user moves on foot and the mesh element area size is large in sections where the user moves in a vehicle.

For this reason, even if the terminal performs the recordation of historical information at a constant period, it is possible to record historical information for each mesh element area with a mesh element area size, which varies according to the moving speed, in a single historical database, thereby optimizing the storage capacity of the historical database.

Figure 15:
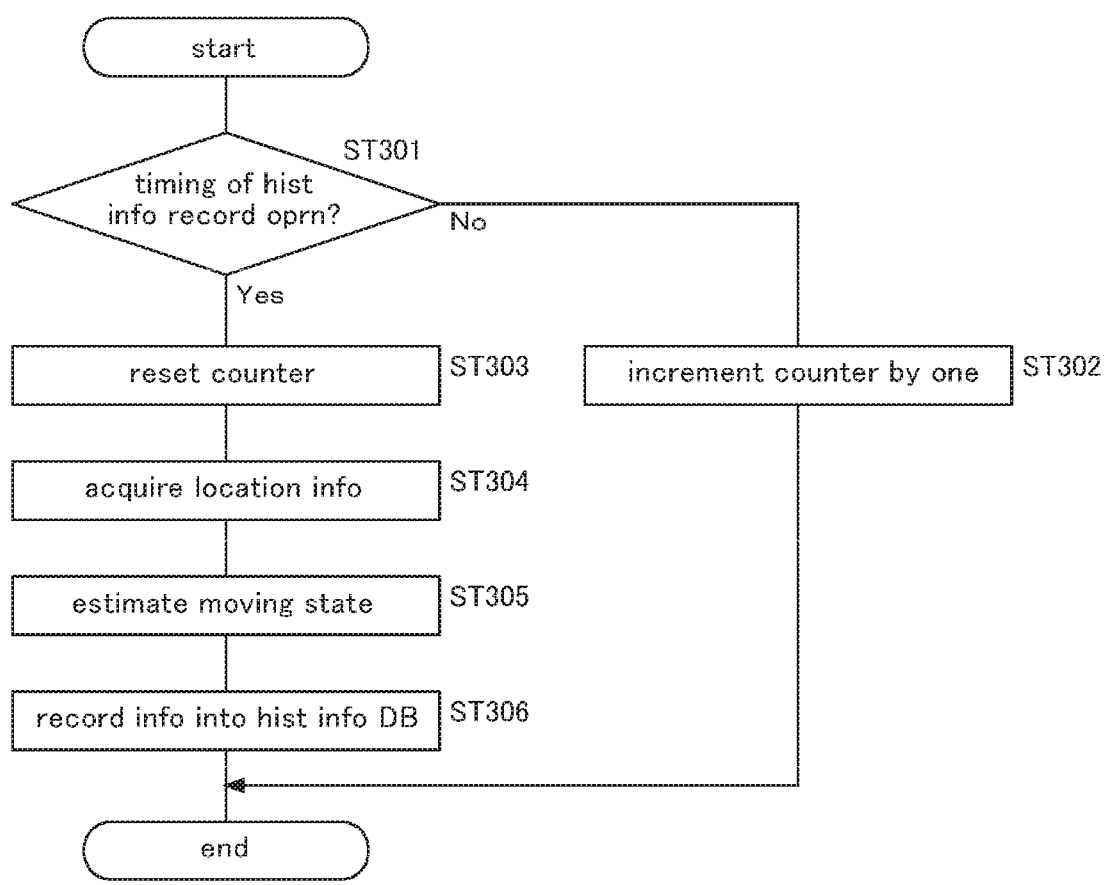
FIG. 15 is a flowchart showing a processing operation procedure performed by the historical data recorder 25 according to yet another embodiment of the present invention.

Next, another processing operation procedure performed by the historical data recorder 25 will be described. FIG. 15 is an explanatory view showing an outline of yet another processing operation procedure performed by a historical data recorder 25.

First, the historical data recorder 25 determines whether it is the timing to perform recordation of historical information based or whether or not the count value of a counter reaches a target value corresponding to the period at which the historical data recorder performs the recordation of historical information (ST 301). When it is not timing when the historical data recorder performs the recordation of historical information (No in ST 301), the counter is incremented by 1 (ST 302).

If it is timing when the historical data recorder performs the recordation of historical information (Yes in ST 301), the counter is reset (ST 303). Next, the controller acquires current location information from the location information acquirer 12 and also acquires past location information from the information storage 14 (ST 304). Next, the controller estimate the moving state of the terminal 1 (moving speed) based on the current location information and the past location information (ST 305). Then, the controller acquires current communication status information (connection destination information and communication quality information), and records the information and the moving speed into the historical database as historical information on the corresponding mesh element area (ST 306).

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

INDUSTRIAL APPLICABILITY

A terminal device, a communication system and a communication control method according to the present invention achieve an effect of enabling the terminal device (terminal) to find an optimal connection destination based on a state of the terminal, and are useful as a terminal device for performing wireless communication with a base station apparatus; a base station apparatus for performing wireless communication with a terminal device; a communication system including a terminal device and a base station apparatus; and a communication control method used in a terminal device for performing wireless communication with a base station apparatus.

Glossary 1 terminal (terminal device)
2 macro cell base station (base station apparatus)
3 low SHF band base station (base station apparatus)
4 high SHF band base station (base station apparatus)
5 wireless LAN base station (base station apparatus)
11 communicator
12 location information acquirer
13 controller
14 information storage 21 moving state estimator
22 destination predictor
23 destination searcher
24 timing controller
25 historical data recorder
26 measurement target extractor
27 communication quality measurer

The invention claimed is:

1. A terminal device for performing wireless communication with base station apparatuses, comprising:
a memory that stores instructions; and
a processor that, when executing the instructions stored in the memory, performs operations including:
acquiring location information on the terminal device;
accumulating, in a storage, a plurality of historical information records, each record including a location within a communication area of the base station apparatuses, a base station identifier, and a past communication quality in association with each other, the base station identifier identifying a base station apparatus of the base station apparatuses, the past communication quality being measured in the past and indicating a quality of a communication between the terminal device at the location in the past and the base station apparatus identified by the base station identifier;
estimating a moving state of the terminal device based on the acquired location information;
predicting a destination area of the terminal device based on the moving state;
extracting, from candidate base station apparatuses which are connectable to the terminal device, one or more measurement target candidates based on one or more historical information records associated with the predicted destination area, the one or more measurement target candidates being one or more base station apparatuses of the one or more history information records each of which includes the past communication quality satisfying a predetermined communication quality; and
measuring one or more communication qualities between the terminal device and the extracted one or more measurement target candidates,
wherein mesh element areas are determined for the communication area of the base station apparatuses such that each mesh element area has a prescribed shape and a uniform size, and the location in each of the plurality of historical information records identifies one of the mesh element areas,
wherein a moving speed of the terminal device is acquired as the moving state, and
wherein, in the extracting, the processor extracts, from the candidate base station apparatuses which are connectable to the terminal device, the one or more measurement target candidates based on the one or more historical information records on mesh element areas to be the predicted destination area, and when the moving speed is high, the processor starts extracting the one or more measurement target candidates at a position where a distance to the mesh element areas to be the predicted destination area is farther than when the moving speed is low.

2. The terminal device according to claim 1,
wherein, when the moving speed is high, the processor sets the destination area to be greater than when the moving speed is low.

3. The terminal device according to claim 2,
wherein, when the moving speed is high, the processor sets a greater number of mesh element areas for the destination area than when the moving speed is low.

4. The terminal device according to claim 2,
wherein, when the moving speed is high, each mesh element area is set to have a greater size than when the moving speed is low.

5. The terminal device according to claim 1,
wherein, in addition to the moving speed, a moving direction of the terminal device is acquired as the moving state, and
wherein, when the terminal device moves in a diagonal direction relative to one of arrangement directions of the mesh element areas, the processor sets a greater number of mesh element areas for the destination area than when the terminal device moves in a parallel direction relative to the arrangement of the mesh element areas.

6. A terminal device for performing wireless communication with base station apparatuses, comprising:
a memory that stores instructions; and
a processor that, when executing the instructions stored in the memory, performs operations including:
acquiring location information on the terminal device;
accumulating, in a storage, a plurality of historical information records, each record including a location within a communication area of the base station apparatuses, a base station identifier, and a past communication quality in association with each other, the base station identifier identifying a base station apparatus of the base station apparatuses, the past communication quality being measured in the past and indicating a quality of a communication between the terminal device at the location in the past and the base station apparatus identified by the base station identifier;
estimating a moving state of the terminal device based on the acquired location information;
predicting a destination area of the terminal device based on the moving state;
extracting, from candidate base station apparatuses which are connectable to the terminal device, one or more measurement target candidates based on one or more historical information records associated with the predicted destination area, the one or more measurement target candidates being one or more base station apparatuses of the one or more history information records each of which includes the past communication quality satisfying a predetermined communication quality; and
measuring one or more communication qualities between the terminal device and the extracted one or more measurement target candidates,
wherein mesh element areas are determined for the communication area of the base station apparatuses such that each mesh element area has a prescribed shape and a uniform size, and the location in each of the plurality of historical information records identifies one of the mesh element areas,
wherein a moving direction of the terminal device is acquired as the moving state, and
wherein, in the extracting, the processor extracts, from the candidate base station apparatuses which are connectable to the terminal device, the one or more measurement target candidates based on the one or more historical information records on mesh element areas to be the predicted destination area, and when the terminal device moves in a diagonal direction relative to one of arrangement directions of the mesh element areas, the processor extracts the one or more measurement target candidates at shorter time intervals than when the terminal device moves in a parallel direction relative to the arrangement of the mesh element areas.

7. The terminal device according to claim 1,
wherein, when the moving speed is high, the processor extracts a greater number of measurement target candidates than when the moving speed is low.

8. The terminal device according to claim 1,
wherein, in addition to the moving speed, a moving direction of the terminal device is acquired as the moving state, and
wherein, when the terminal device moves in a diagonal direction relative to one of arrangement directions of the mesh element areas, the processor extracts, from the candidate base station apparatuses which are connectable to the terminal device, a greater number of measurement target candidates than when the terminal device moves in a parallel direction relative to the arrangement of the mesh element areas.

9. The terminal device according to claim 1, wherein the processor, when executing the instructions stored in the memory, further performs operations comprising: controlling timing to start a connection destination search operation, and
wherein the processor controls timing to start the connection destination search operation based on the moving speed and whether or not there is a difference between a radio communication frequency used by the base station apparatus to which the terminal device is currently connected and a radio communication frequency used by each of the measurement target candidates.

10. The terminal device according to claim 1,
wherein each of the plurality of historical information records further includes a past moving speed in association with the location, the base station identifier and the past communication quality, and
wherein, in the extracting, the processor extracts, from the candidate base station apparatuses which are connectable to the terminal device, the one or more measurement target candidates based on the historical information records associated with the acquired moving speed.

11. The terminal device according to claim 10,
wherein the processor accumulates the plurality of historical information records by performing, at a period, operations including:
acquiring, when the terminal device is moving at a moving speed and communicates with a base station apparatus at a location, a communication quality, the location, the moving speed and a base station identifier identifying the base station apparatus; and
recording the acquired communication quality in association with the acquired moving speed, the acquired location and the acquired base station identifier, as a historical information record of the plurality of historical information records, and
wherein the processor changes the period at which the historical information record is recorded depending on the acquired moving speed.

12. The terminal device according to claim 1, wherein the processor accumulates the plurality of historical information records by performing, at a constant period, operations including:
acquiring a communication quality when the terminal device communicates with a base station apparatus at a location; and
recording the acquired communication quality in association with the location and a base station identifier identifying the base station apparatus, as a historical information record of the plurality of historical information records.

13. A communication system including a terminal device for performing wireless communication with base station apparatuses,
wherein the terminal device comprises:
a memory that stores instructions; and
a processor that, when executing the instructions stored in the memory, performs operations including:
acquiring location information on the terminal device;
accumulating, in a storage, a plurality of historical information records, each record including a location within a communication area of the base station apparatuses, a base station identifier, and a past communication quality in association with each other, the base station identifier identifying a base station apparatus of the base station apparatuses, the past communication quality being measured in the past and indicating a quality of a communication between the terminal device at the location in the past and the base station apparatus identified by the base station identifier;
estimating a moving state of the terminal device based on the acquired location information;
predicting a destination area of the terminal device based on the moving state;
extracting, from candidate base station apparatuses which are connectable to the terminal device, one or more measurement target candidates based on one or more historical information records associated with the predicted destination area, the one or more measurement target candidates being one or more base station apparatuses of the one or more history information records each of which includes the past communication quality satisfying a predetermined communication quality; and
measuring one or more communication qualities between the terminal device and the extracted one or more measurement target candidates,
wherein mesh element areas are determined for the communication area of the base station apparatuses such that each mesh element area has a prescribed shape and a uniform size, and the location in each of the plurality of historical information records identifies one of the mesh element areas,
wherein a moving speed of the terminal device is acquired as the moving state, and
wherein, in the extracting, the processor extracts, from the candidate base station apparatuses which are connectable to the terminal device, the one or more measurement target candidates based on the one or more historical information records on mesh element areas to be the predicted destination area, and when the moving speed is high, the processor starts extracting the one or more measurement target candidates at a position where a distance to the mesh element areas to be the predicted destination area is farther than when the moving speed is low.

14. A communication control method used in a terminal device for performing wireless communication with base station apparatuses, comprising:
accumulating, in a storage, a plurality of historical information records, each record including a location within a communication area of the base station apparatuses, a base station identifier, and a past communication quality in association with each other, the base station identifier identifying a base station apparatus of the base station apparatuses, the past communication quality being measured in the past and indicating a quality of a communication between the terminal device at the location in the past and the base station apparatus identified by the base station identifier;

acquiring location information on the terminal device;

estimating a moving state of the terminal device based on the acquired location information;

predicting a destination area of the terminal device based on the moving state;

extracting, from candidate base station apparatuses which are connectable to the terminal device, one or more measurement target candidates based on one or more historical information records associated with the predicted destination area, the one or more measurement target candidates being one or more base station apparatuses of the one or more history information records each of which includes the past communication quality satisfying a predetermined communication quality;

measuring one or more communication qualities between the terminal device and the extracted one or more measurement target candidates; and determining mesh element areas for the communication area of the base station apparatuses such that each mesh element area has a prescribed shape and a uniform size, and the location in each of the plurality of historical information records identifies one of the mesh element areas, wherein a moving speed of the terminal device is acquired as the moving state, and wherein, in the extracting, the one or more measurement target candidates are extracted based on the one or more historical information records on mesh element areas to be the predicted destination area, and when the moving speed is high, the extracting of the one or more measurement target candidates is started at a position where a distance to the mesh element areas to be the predicted destination area is farther than when the moving speed is low.

* * * * *